United States Patent [19]

Boyd et al.

[11] 4,114,139

[45] Sep. 12, 1978

[54] SECURITY CONTROLLED INFORMATION EXCHANGE SYSTEM

[75] Inventors: William Weller Boyd; Robert Joseph Grafe; Carl Oscar Pingry, III, all of Austin, Tex.

[73] Assignee: International Business Machines Corporation, Armonk, N.Y.

[21] Appl. No.: 762,376

[22] Filed: Jan. 25, 1977

[51] Int. Cl.² .............................................. H04Q 9/00
[52] U.S. Cl. .............................. 340/147 R; 179/2 DP
[58] Field of Search ...................... 340/149 R, 147 R; 178/22; 179/2 DP; 235/153 R

[56] References Cited

U.S. PATENT DOCUMENTS

| 3,654,604 | 4/1972 | Crafton | 340/149 R |
| 3,931,504 | 1/1976 | Jacoby | 235/153 R |

Primary Examiner—Donald J. Yusko

[57] ABSTRACT

A security controlled information exchange system for controlling the orderly exchange of information between two or more users under primary control of security identifiers. Each user is set up with a local user indentifier (LUID) and a number of remote user identifiers (RUID). Also, associated with selected ones of the RUIDs, are jobs which are to be communicated. A user initiates communication transfer by forwarding to another terminal its LUID and the receiving user compares the received LUID with its list of RUIDs and if a compare is made, the receiver forwards its own LUID to the initiating party. If a compare is is not made, it disconnects. The initiating party then compares the LUID which has been forwarded to it with its list of RUIDs and if no compare is made, it disconnects. If a compare is made, however, it holds onto the line and the called party then sends the jobs which are associated with the RUID which corresponds to the LUID which it received. Each RUID may be associated with a single unique job which may be forwarded to a calling user or may be associated with a number of jobs which may be chained and automatically forwarded to the calling user. In addition, a number of RUIDs may be associated with the same job or with selected ones of jobs in the complete job list.

13 Claims, 19 Drawing Figures

DATA STRUCTURE FOR MEM2

LUID BUFFER 21 BYTES
- LUID - 1 TO 20 CHARACTERS - ID WHICH WAS SENT
- DELIM - ID DELIMITER

RUID BUFFER 21 BYTES
- RUID - 1 TO 20 CHARACTERS - ID WHICH WAS RECEIVED
- DELIM - ID DELIMITER

CONTENTS OF LUID BUFFER IS A DON'T CARE UNLESS IDSENT IS TRUE.
CONTENTS OF RUID BUFFER IS A DON'T CARE UNLESS IDRCVD IS TRUE.

SECURITY CONTROLLED INFORMATION EXCHANGE SYSTEM

CROSS-REFERENCE TO RELATED APPLICATIONS

"Method for Communicating Text Commands and Instructions Using Conventional Coded Text Characters and a Structure for Decoding and Presenting Command and Instruction Signals", Ser. No. 693,822, Robert G. Bluethman and William W. Boyd, inventors, filed June 7, 1976, and assigned to the assignee of this application.

BACKGROUND OF THE INVENTION

1. Field of the Invention

This invention relates to communicating systems in general and more particularly, to a communicating system in which security control words are exchanged between both parties in a two-way communications exchange and the communications security words are further used to control selective data exchange.

2. Description of the Prior Art

Security in a system in which multiple users have access to a common data bank or in which multiple users can communicate with each other has historically presented a problem. That is, it is extremely important that data contained in a data bank be only accessed or manipulated by those users which are authorized to do so.

Many prior art techniques have been utilized to prevent unauthorized access to a data bank or a terminal by an unauthorized user. One of the most common earlier techniques to prevent unauthorized access to data was a technique in which the user desiring access was required to key in an identifier code. This identifier code was then examined by the receiving party to determine whether access would be allowed. If the code were a proper code, automatic communications channels would then be set up for the sending and receiving of information between the requesting party and the receiving party. Thus, a one-way identification was required. Other variations of this technique included patch board wiring of terminals to provide a unique identifier code. This technique had a primary shortcoming in that the code could be obtained by examining the patch board or plug board wiring and could therefore be duplicated by a person seeking to break security of the system. This led to a more sophisticated technique in which the identifier code was hardwired in a manner such that visual examination would not yield the specific code. This type of system is described in U.S. Pat. No. 3,735,106 entitled "Programmable Code Selection for Automatic Address Answerback in a Terminal System" with John T. Holloway as inventor. However, in all of these systems above discussed, the security provided was only one-way in that once the receiving party had verified that the code was a proper identifier code, communications could be established. This is without consideration as to whether the particular party sending the code was actually authorized to use the code.

In addition, in heretofore known communications systems, communication codes which were sent were used almost exclusively to establish the communication link and no control of data accessing at all or other use of the security codes was contemplated.

SUMMARY OF THE INVENTION

A security controlled information exchange system for controlling the orderly exchange of information between two or more users under primary control of security identifiers is discussed. Each user is set up with a local user identifier (LUID) and a number of remote user identifiers (RUID). In the preferred embodiment, associated with selected ones of the RUIDs, the jobs which are to be communicated. A user initiates communication transfer by forwarding to another terminal its LUID and the receiving user compares the received LUID with its list of RUIDs and if a compare is made, the receiver forwards its own LUID to the initiating party. If a compare is not made it disconnects. The initiating party then compares the LUID which has been forwarded to it with its list of RUIDs and if no compare is made, it disconnects. If a compare is made, however, it holds onto the line and the called party then sends the jobs which are associated with the RUID which corresponds to the LUID which it received. Each RUID may be associated with a single unique job which may be forwarded to a calling user or may be associated with a number of jobs which may be chained and automatically forwarded to the calling user. In addition, a number of RUIDs may be associated with the same job or with selected ones of jobs in the complete job list.

DESCRIPTION OF THE PREFERRED EMBODIMENT

Figure 1:
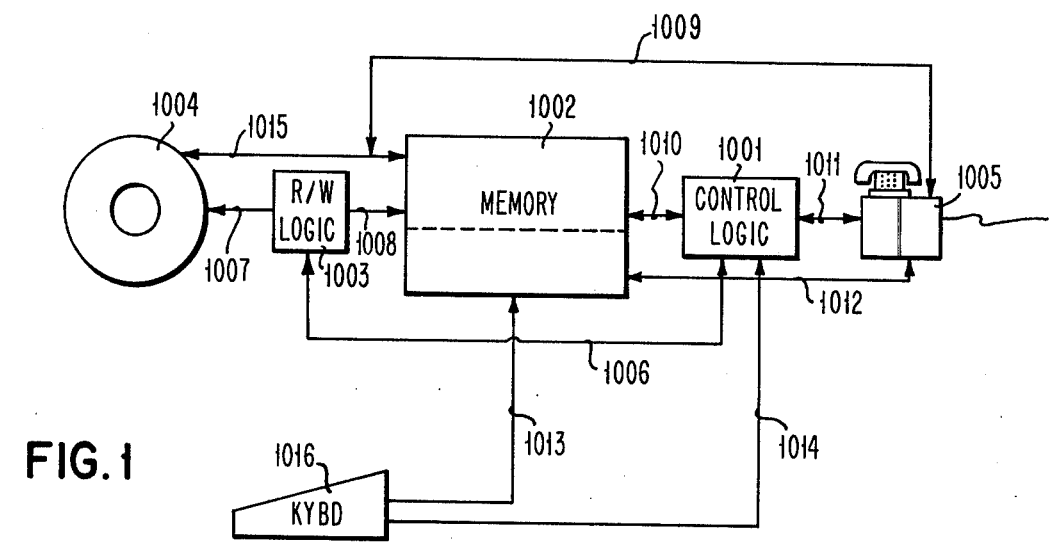
FIG. 1 is an overall block diagram of a user terminal or station.

Prior to a detailed description of the preferred embodiment, a general description of the overall system will be provided.

As previously discussed, security in most prior art systems was one-way. That is, a user desiring to access another terminal or data bank would forward an identification code which would be examined by the called location to determine if it were a proper code and if a compare were made indicating that it was a proper code, a communications channel would be established. This is without regard as to whether the calling location was connected to the desired called location. Thus, it became obvious that an additional level of security was required, that of assuring that the calling party was actually in communication with a desired called party. In the present invention this added level of security is obtained by the following sequence. First, the calling party must send its own local user identifier code (LUID) to the called party and the called party then examines the LUID that it received against its list of remote user identifier (RUID) codes which it contains and upon a proper match, it sends its own LUID to the calling party which then examines its code against its own list of RUIDs. If a match is not made, the communications attempt is aborted. In this manner, it is not only assured that the called party has received a valid identifier code for security purposes, but in addition, it is assured that the calling party is connected to the desired called party. An additional level of security, as will be described in detail below, is obtained by incorporating this exchange of codes into the data exchange between the two users. That is, unless this two level mode of verificiation is obtained, first the communications channel will not be established, but in addition, unless, in the preferred embodiment, this two level exchange of codes takes place the parties cannot exchange any information since the codes themselves are used to control the information flow between the users. Also, adding to the systems security is that for meaningful use of the data in the system the jobs associated with each identifier must be known.

For purposes of brevity, the following discussion will be limited to a communications job which by definition will include a number of setups. That is, in each communications job there may be, for instance, ten setups. In each setup the communications parameters are included along with the LUID and appropriate RUIDs selected by the operator. Each setup may also contain a queue specifying up to 32 jobs to be sent. The communications parameters in each setup include such things as how the job is to be sent, including instructions for preprocessing, device selection, special communication parameters, and any information field to be sent ahead of the job. As is usual, these parameters have standard default values, and are alterable by the operator during the preparation of the communication setups.

The queue within each communication setup can be used individually by having an auto parameter in that setup answered "no" (default), or a larger queue can be obtained by answering the auto parameter "yes" in two or more setups. All setups (within the same communication job) with auto answered "yes" are effectively also linked or chained together into a larger queue. This is especially advantageous when using the security ID feature for selective sending of jobs as will be explained in more detail below.

The ID field which normally contains the LUID and RUIDs in each setup, is simply left blank if the security ID feature is not to be used. This is not the preferred use of the security aspects of the system. However, if the setup selected for communication has the ID field empty, the job specified in that setup will be transmitted when a data link is established. If the setup has Auto-yes specified, a sequential, circular search of the remainder of setups in that communication job will commence and the job specified in each setup with Auto-yes and ID field left blank will be sent. This continues until all the setups in that job have been checked.

In the preferred embodiment, however, which includes the security ID feature, to invoke the security ID feature, a LUID must be keyed in the ID field of the setup. A list of, for instance, 1 to 7 RUIDs must also be keyed in the ID field of the setup.

If the Auto parameter is answered "no", the operation is similar to that when not using the IDs except that an ID exchange must be completed before the jobs will be sent.

However, in accordance with the preferred mode of operation, the operation of the communication job queue is greatly enhanced by using the security ID feature in conjunction with Auto linked setups. In addition to offering a greater measure of security to protect information, since each setup mates a queue of jobs to be sent with a list of one or more RUIDs authorized to receive them, this technique also provides the capability of selectively sending certain jobs to specific recepients, even in an unattended mode, without restrictions on the order of the calls.

An example is as follows:
All Setups shown are Auto-yes, Hold Line-no

| Comm Job FF | ID Field | Jobs in Queue |
|---|---|---|
| Setup 1 | AUS01, LEX23 | A, N |
| Setup 2 | AUS01, BLDR17 | C, E |
| Setup 3 | AUS01, OPDHQ, GSDHQ | D |
| Setup 4 | AUS01, LEX23, BLDR17 | X, Y, AA |
| Setup 5 | AUS01 | B |

Suppose Setup 1 is selected and the start key depressed, and the machine is left unattended in the Auto-Answer mode. Then, if called were received in the following order, with the RUIDs received as shown, the following table shows the Jobs which would be sent. (Assuming that each caller will accept the LUID of AUS01).

| Calls | RUID Received | Jobs Sent |
|---|---|---|
| 1 | OPDHQ | D, B, |
| 2 | LEX23 | A, N, X, Y, AA, B |
| 3 | ANYBODY | B |
| 4 | GSDHQ | D, B |
| 5 | BLDR17 | C, E, X, Y, AA, B |

Note that since Setup 5 contains no RUIDs, any caller who sends any ID in a valid ID Control Format will receive Job B. This would be used for broadcast type messages to go to all callers.

Since 'Hold Line-no' was specified, after 20 seconds of inactivity on the line, the data link will be dropped, and the machine will reset to the starting Setup (1 in this case) and await the next call.

For a more detailed description of the invention, refer first to FIG. 1 which is an overall generic block diagram. As shown in FIG. 1, bulk media storage 1004 interfaces with memory 1002 along lines 1015. Read/write logic 1003 which interfaces bulk media storage along 1007 interfaces with the emory along line 1008. The communication system 1005 can interface directly with the bulk media system along line 1009 under control of the control logic 1001. The control logic 1001 interfaces with the communication system along line 1011 and with the memory 1002 along line 1010. A communication system also interfaces directly with the memory along line 1012 under control of control logic 1011. The control logic 1001 and the read/write logic 1003 are in two-way communication with each other along line 1006. The keyboard 1016 is in direct communication with the memory along line 1013 and the control logic 1001 along line 1014.

The detailed operation of the overall system of FIG. 1 will become apparent from the following detailed discussion of FIGS. 2-19.

Figure 2:
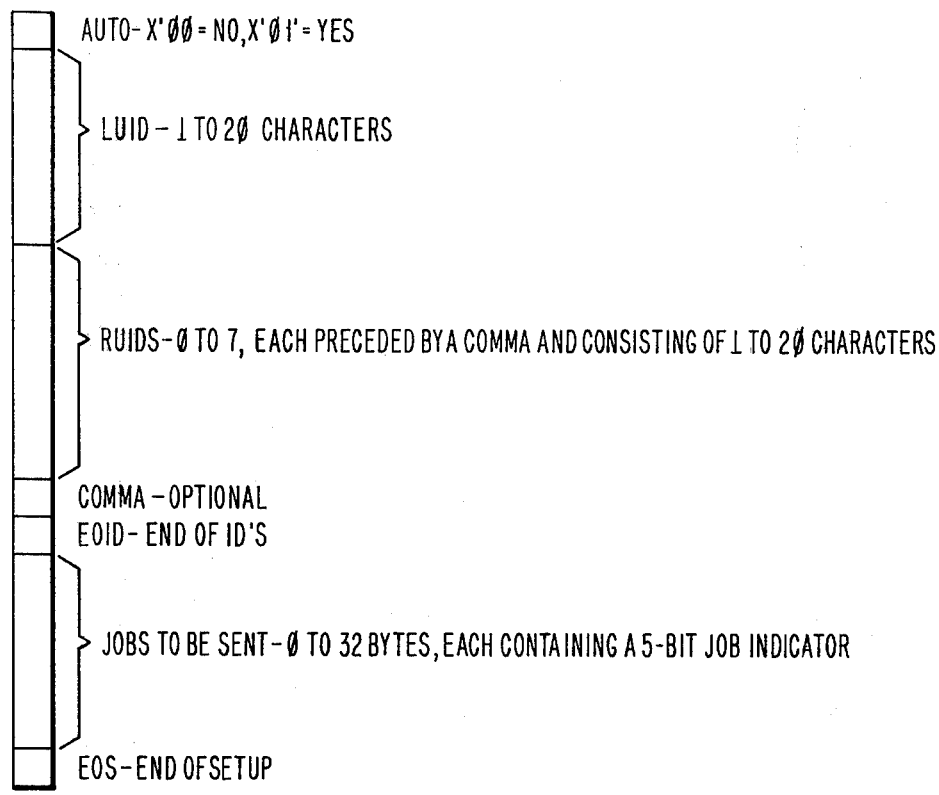
FIG. 2 is a layout illustrating the data structure of memory one with identifier codes.
Figure 3:
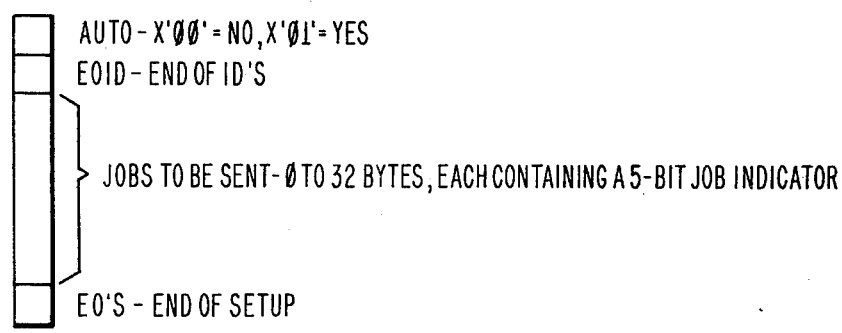
FIG. 3 is a layout illustrating the data structure without identifier codes.

Following is the description of the two memories used in the system. Memory 1 contains the setup as read from the media system, which consists of two general cases. The first one as shown in FIG. 2 is with IDs, and the second one is without IDs as shown in FIG. 3. Looking at FIG. 2, the first byte gives the auto setup linking indication where 00 indicates no auto linking; 01 indicates auto linking. The second section contains the local user ID (LUID) which contains 1 to 20 characters.

The next section contains the remote user IDs (RUID) which may consist of from 0 to 7 RUIDs each preceded by a comma and each consisting of 1 to 20 characters. The RUIDs may be followed by an optional comma. If there are no IDs, the LUID field may be followed by an optional comma. The end of the two ID fields must be followed by an end of ID delimiter (EOID). This end of ID delimiter is followed by from 0 to 32 bytes each containing a five bit job indicator. The entire setup is then terminated by an end of setup delimiter (EOS).

In FIG. 3, the setup without any IDs is shown. In this case the first byte is the auto indicator the same as with IDs, but the second byte must contain an EOID indicator which indicates tha there were no IDs present. This is again followed by from 0 to 32 bytes each containing a five bit job indicator which is followed again by an end of setup delimiter.

Figure 4:
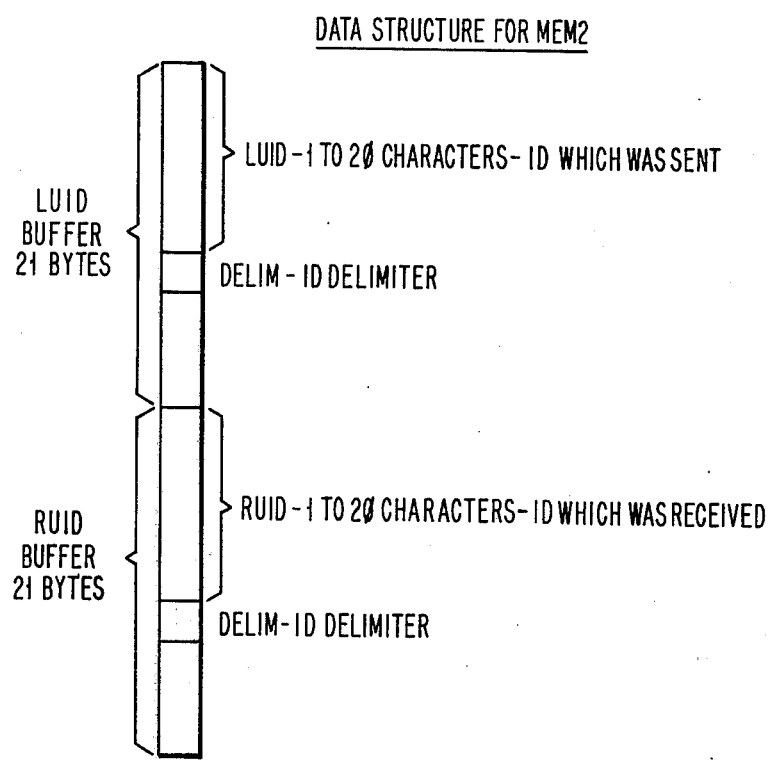
FIG. 4 is a layout illustrating the data structure of memory two.

FIG. 4 shows the data structure for Memory 2. This consists of two 21 byte buffers, the first one for the LUID, the second one for the RUID. The LUID is placed in this buffer just prior to being sent and is used for comparing when searching additional auto linked setups. The RUID section of this buffer always contains the last ID received from the communication line. The contents of the LUID buffer is not relevant unless "ID sent" (IDSENT) is true. The contents of the RUID buffer is not relevant unless "ID received" (IDRCVD) is true. When there are IDs present in these buffers they are always terminated by an ID delimiter (DELIM).

Figure 5:
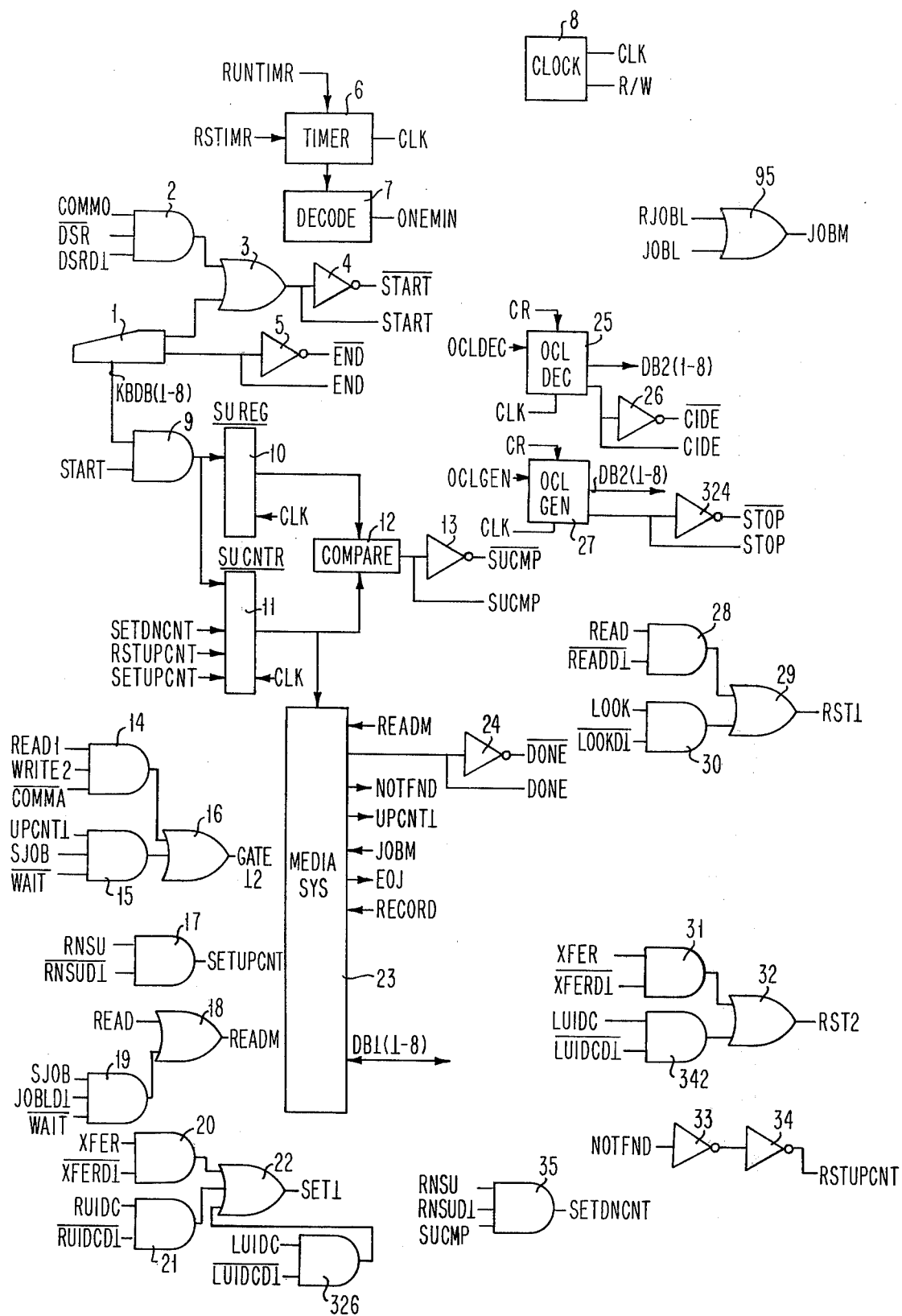
FIGS. 5-19 are logical diagrams of the systems control of the invention.
Figure 6:
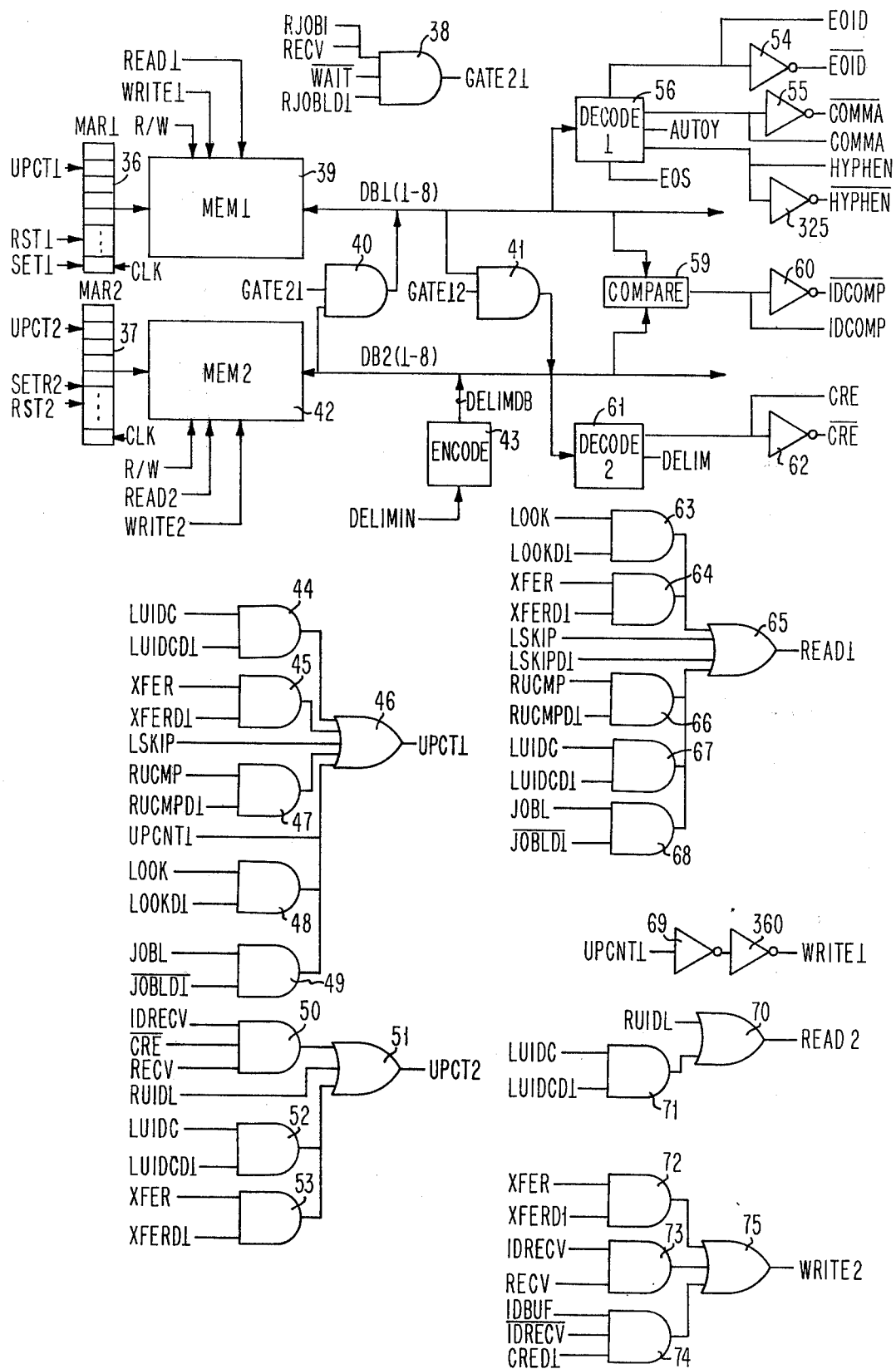

As shown in FIG. 5, the system is composed of a clock 8 with signals clock (CLK) and read/write (R/W) which both go to Memory 1 and Memory 2, labeled 39 and 42 respectively as shown in FIG. 6. Memory 1 is controlled by memory address register 1, labeled 36 and memory address register 2, labeled 37. From Memory 1 there is a data bus 1 which is 8 bits wide. From Memory 2 there is data bus 2 which is also 8 bits wide. Compare 59 is connected to data bus 1 and data bus 2 to generate IDCOMP which is inverted by inverter 60 to generate $\overline{\text{IDCOMP}}$. From data bus 1 there is a decode 1 labeled 56 from which there are several decodes. EOID is generated and inverted by inverter 54 to generate $\overline{\text{EOID}}$. Generated from decode 1 is COMMA which is inverted by inverter 55 to generate $\overline{\text{COMMA}}$. Also the decode AUTOY (auto yes) is generated. HYPHEN is also decoded, and this signal is inverted by inverter 325 to generate $\overline{\text{HYPHEN}}$. EOS (end of set up) is also decoded. From data bus 2 decode 2, labeled 61, has two decodes. CRE (carrier return) is generated and inverted by inverter 62 to generate $\overline{\text{CRE}}$. DELIM (ID Delimiter) is also decoded. An ID Delimiter is also encoded by encode 43 onto data bus 2. As shown in FIG. 5, a timer is also utilized in this system and it is labeled 6. There is a decode labeled 7 from the timer which brings 1 minute signal ONEMIN true after expiration of one minute. Also, a keyboard labeled 1 is used in this system. From the keyboard there is a signal that goes through OR gate 3 to generate a signal labeled START which is inverted by inverter 4 generating signal $\overline{\text{START}}$. AND gate 2 which will be described later, also generates a signal which is ORed through OR gate 3 which generates START. Also eminating from the keyboard is a signal labeled END which is inverted by inverter 5 to generate $\overline{\text{END}}$. There is a keyboard data bus coming from the keyboard which is ANDED with the START pulse which will load information into the starting setup register labeled 10 and the setup counter labeled 11. The function of both of these will be described later. The output of elements 10 and 11 are input to a compare circuit 12 to generate setup compare SUCMP which is inverted by inverter 13 to generate $\overline{\text{SUCMP}}$. A media system which could be any media system is used. There are some typical control lines going into and coming from the media system which control the media. Firstly, there is data bus 1 which is 8 bit wide. There is a READM line which tells the media system to read the media. There is a JOBM line which when true along with READM tells the media system to read a job. If JOBM is not true and READM is true, then the media system reads a setup. When the end of job is detected, the EOJ signal is generated. When reading and a particular job is found, the signal UPCNT1 is brought true. When a particular job is not found when told to read, the media system will bring true the signal NOTFND. When actively reading, the media system will put data characters on DB1. When reading a setup as defined by READM being true and JOBM being not true and the setup has been read and completed, the signal DONE will become true and is inverted by inverter 24 to generate $\overline{\text{DONE}}$. When requested to record, the media system requires RECORD being true and JOBM being true. The RECORD signal actually controls the recording of data. The JOBM signal is brought down to terminate the job. When recording, characters are presented to the media system on data bus 1.

Figure 7:
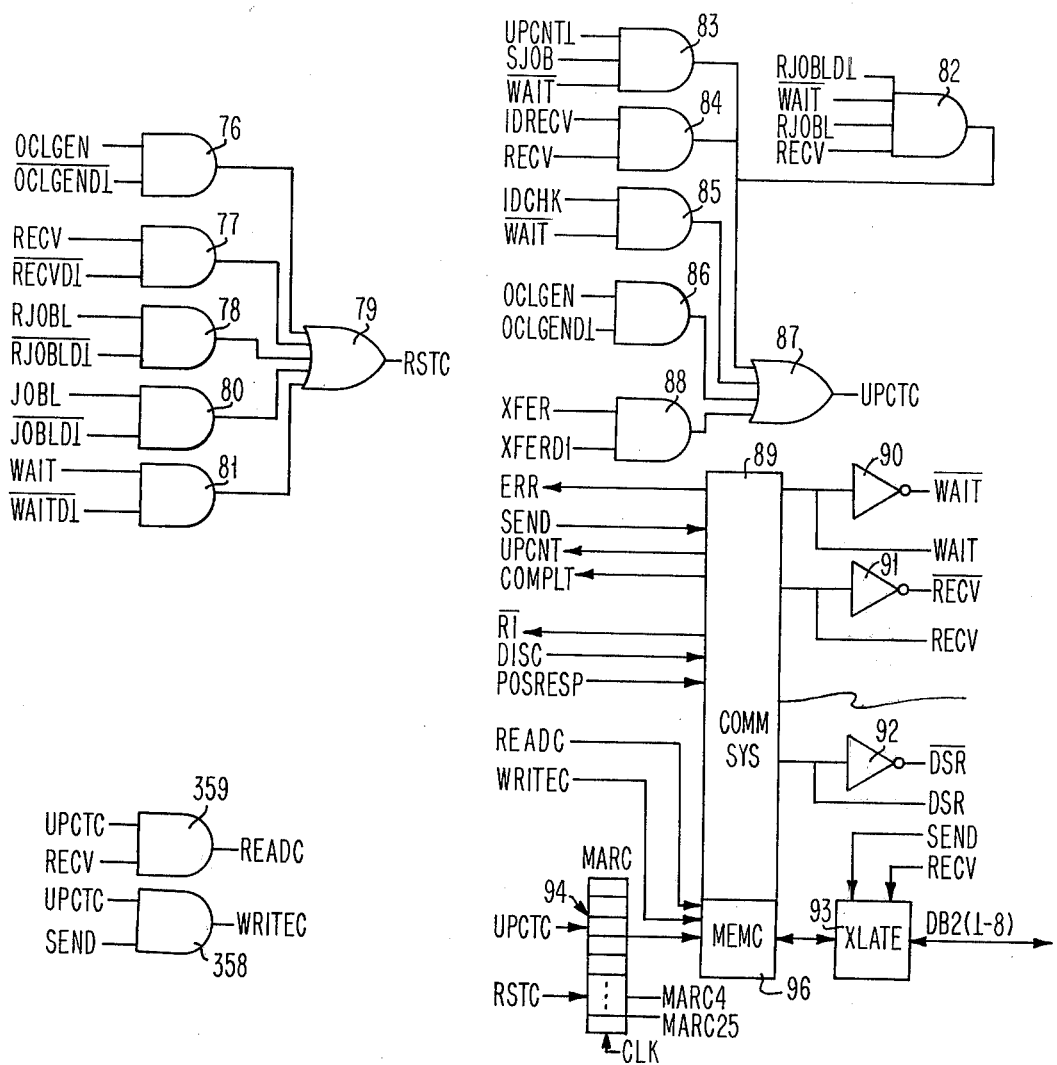

As shown in FIG. 7, another part of the system is the communication system labeled 89, which can be any communication system, contains its own memory, Memory C, labeled 96, which is controlled by memory address register C labeled 94. Attached to the communication system is data bus 2 which is 8 bits wide but there is a translator involved because the data characters have to be translated into the proper line code and vice-versa through translate 93. The communication system controls the actual communication of data to and from the telephone line and has its own separate control of data in and out of MEMC. When the telephone line is established, the signal DSR is generated and inverted by inverter 92 to generate $\overline{\text{DSR}}$. The communication system drives a line named $\overline{\text{RI}}$ when a call has been received. To request the communication system to send, the SEND line is driven true. Temporary halts as determined by the communication system are reflected in the logic by using the signal WAIT which is inverted by inverter 90 to generate $\overline{\text{WAIT}}$. When the communication system is through sending a job, it will drive the line labeled COMPLT. When the communication system is receiving, it brings true the signal labeled RECV which is inverted by inverter 91 to generate the $\overline{\text{RECV}}$. When a complete job has been received, the RECV signal is dropped. The WAIT signal operates in the same manner as it does when sending. To tell the communication system to disconnect and get off the telephone line, the signal DISC is brought true.

There are other signals associated with the memory address registers which will result in the memory address registers being counted up or counted down or reset or set to a particular desired value. Examples of these are UPCT1, RST1, SET1, which are associated with memory address register 1 as shown in FIG. 6. Other examples are UPCT2, SETR2, and RST2 all of which are associated with memory address register 2. Associated with memory address register C are signals READC, WRITEC, UPCTC and RSTC as shown in FIG. 7. Also associated with memory address register C is decode MARC4 and decode MARC25.

As shown in FIG. 6 additional memory controls are on Memory 1. The lines READ1 and WRITE1 are used when these respective operations are desired for Memory 1. READ2 and WRITE 2 associated with Memory 2 perform these same functions for Memory 2. There is need to transfer data from data bus 1 to data bus 2. This is done by AND gate 41 as gated by signal GATE12. There is also a need to transfer data from data bus 2 to data bus 1. This is done by AND gate 40 which is gated by signal GATE21.

Figure 8:
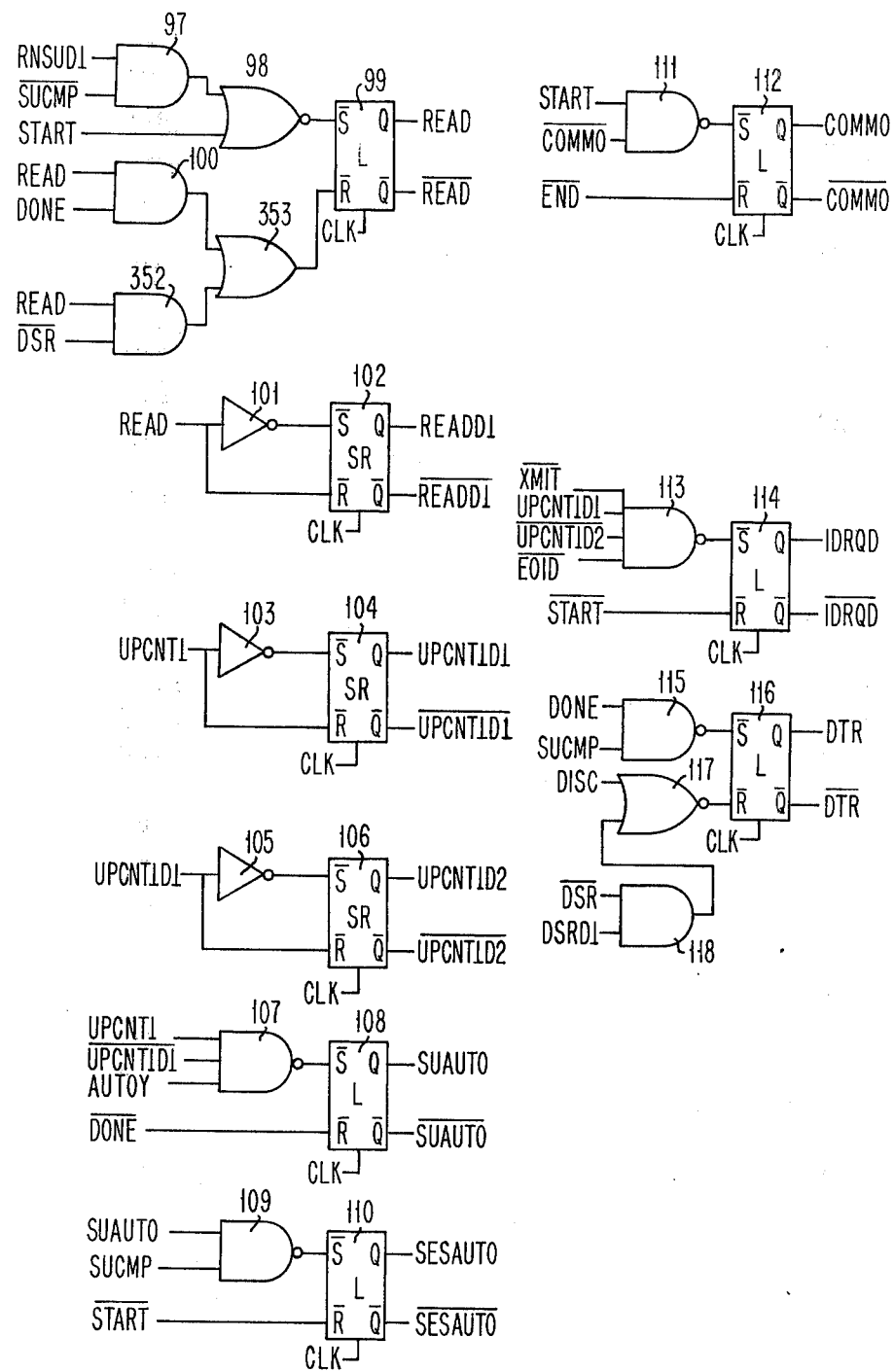

Referring to FIG. 5, the starting setup number is keyed on the keyboard and is placed on the keyboard data bus KBDB. When the start key is depressed, a signal from the keyboard is gated through OR gate 3 to generate START. This signal is combined with $\overline{\text{COMMO}}$ in NAND gate 111 to set COMMO latch 112 as shown in FIG. 8. Returning to FIG. 5 START is also used to gate the starting setup number from the keyboard data bus through AND gate 9 into the starting setup register labeled 10 and the setup counter labeled 11. Compare 12 then brings up SUCMP which indicates that the content of setup counter 11 is equal to the starting setup number as indicated by starting setup register 10. START is also gated through NOR gate 98 to set READ latch 99 as shown in FIG. 8. READ is then inverted by inverter 101 and fed to shift register 102 to bring up READD1 at the next clock time. READ and $\overline{\text{READD1}}$ are then combined in AND gate 28 and gated through OR gate 29 to bring up RST1 for one clock time, which resets memory address register 1 as shown in FIG. 5. This prepares Memory 1 for reading of the starting setup. The READ signal is also gated through OR gate 18 to bring up READM which tells the media system to begin reading the setup as specified in the setup counter 11. When the media system beings to read the setup it brings up UPCNT1 which is gated through OR gate 46 to bring up UPCT1 which causes the memory address register 1 to count up each clock time as shown in FIG. 6. UPCNT1 is also inverted by inverter 69 and inverted again by inverter 360 to bring up WRITE1 which causes the data from data bus 1 to be written into Memory 1. Referring to FIG. 8, UPCNT1 is also inverted by inverter 103 and fed to shift register 104 to bring up UPCNT1D1 at the next clock time. This signal is then inverted by inverter 105 and fed to shift register 106 to bring up UPCNT1D2 at the next clock time. Since the first byte of the setup which contains the auto linking indicator will be on the data bus during the clock time where UPCNT1 is true and UPCNT1D1 false, these two signals are ANDED with AUTOY signal from the decode 1 in AND gate 107 and used to set latch SUAUTO labeled 108 if AUTOY was true. SUAUTO is then ANDed with SUCMP, which indicates that the starting set up is being read, in AND gate 109 and used to set latch SESAUTO labeled 110. When this latch is set, it indicates that auto setup linking is to be used for this session. This latch will remain set until the end of the session. This latch is reset only by the START signal coming true or $\overline{\text{START}}$ going false.

The second byte of the setup will contain an EOID if no IDs are specified in the setup. Since the second byte is on data bus 1 during the clock time where UPCNT1D1 is true and UPCNT1D2 is false, UPCNT1D1, $\overline{\text{UPCNT1D2}}$, XMIT, and $\overline{\text{EOID}}$ are combined in NAND gate 113 to set IDRQD latch 114 if there are any IDs specified in the setup. This latch is reset only by the START signal. When the end of the setup being read is reached, the media system brings DONE true during the last clock time of the read. This signal DONE is anded with READ in AND gate 100 and gated through OR gate 353 and used to reset the READ latch 99. DONE is also inverted by inverter 24 to generate $\overline{\text{DONE}}$, which is used to reset the SUAUTO latch 108. DONE is also combined with SUCMP, which is true at this time since we are reading the starting setup, in NAND gate 115 and used to set the DTR latch 116. The DTR signal is fed to the communication which indicates that the terminal is ready for communication. The system logic then remains in this condition until the communication system brings up the DSR signal indicating that a phone connection has been made.

Figure 10:
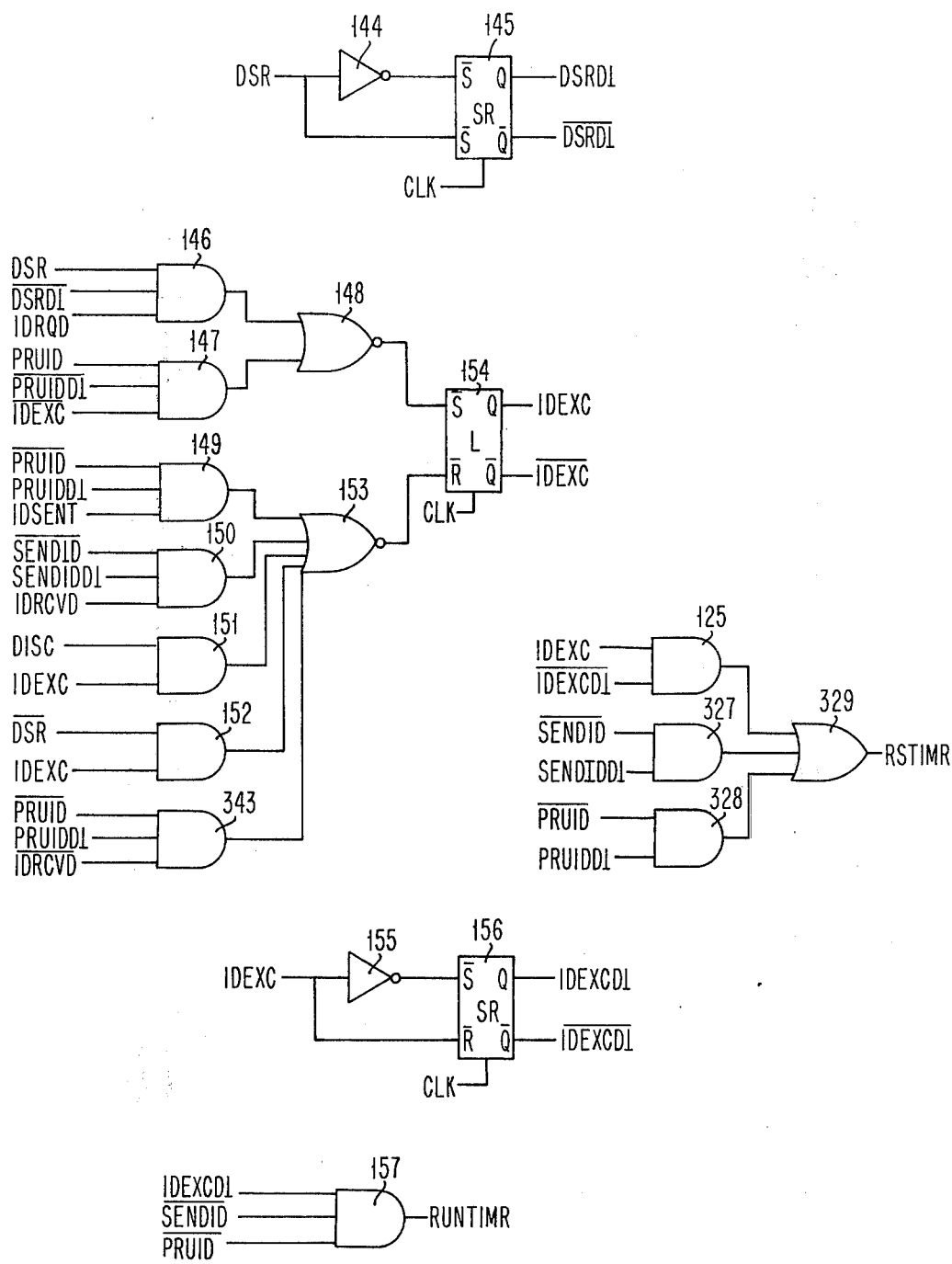
Figure 11:
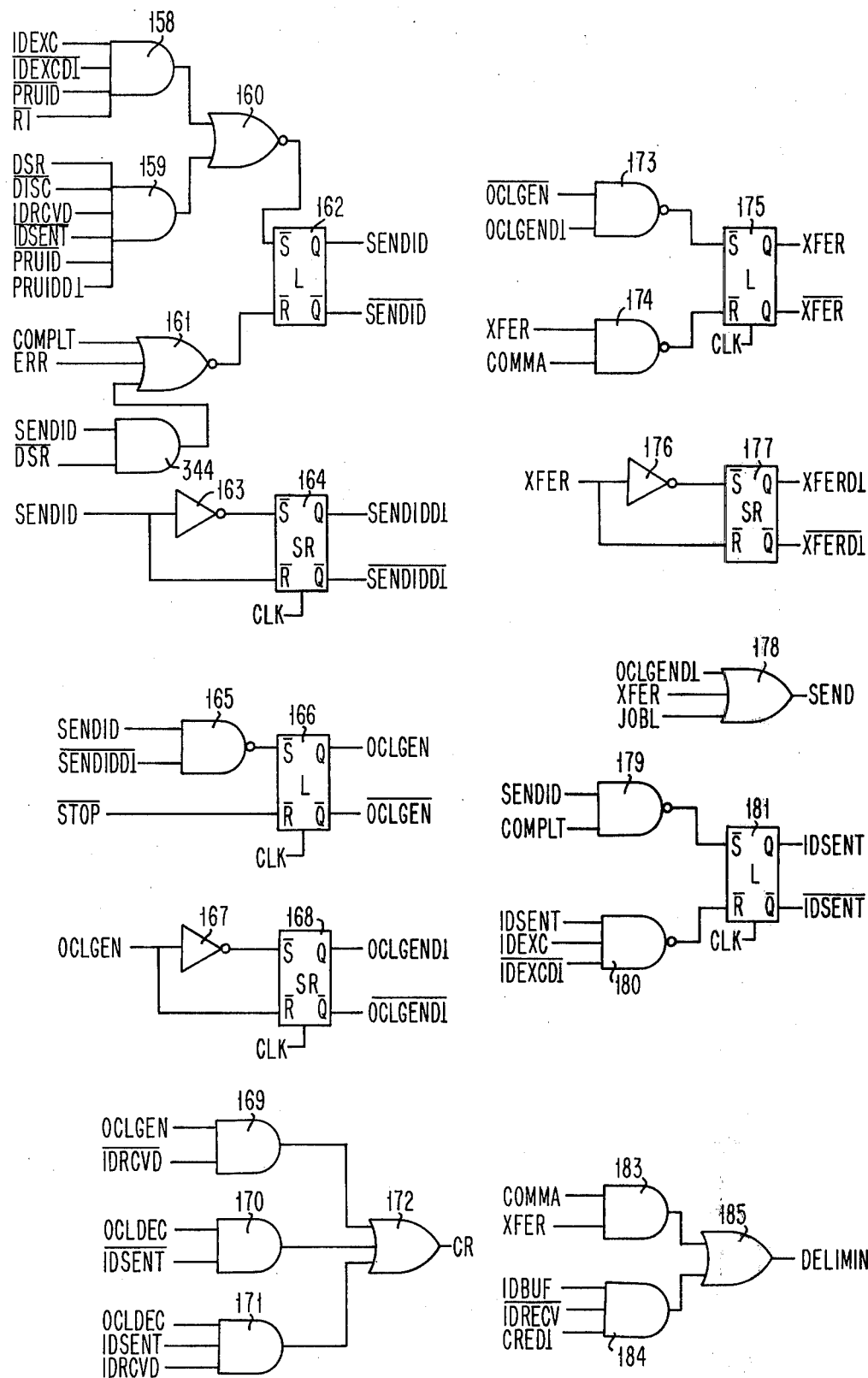

First consider the case where an ID is required which means IDRQD is true, and where ring indicator RI is false. This indicates that we were not the called party, which means that when DSR comes true we will send our LUID first. This is accomplished in the following manner. When the communication system brings up DSR it is inverted by inverter 144 and fed to shift register 145 which brings up DSRD1 at the next clock time as shown in FIG. 10. DSR and $\overline{\text{DSRD1}}$ are anded with IDRQD in AND gate 146 and gated through NOR gate 148 which sets IDEXC latch 154. IDEXC is then inverted by inverter 155 and fed to shift register 156 which brings up IDEXCD1 at the next clock time. IDEXC and $\overline{\text{IDEXCD1}}$ are anded in AND gate 125 and gated through OR gate 329 to bring up RSTIMR for one clock time, which resets one minute timer labeled 6. IDEXC and $\overline{\text{IDEXCD1}}$ are anded with $\overline{\text{RI}}$ and $\overline{\text{PRUID}}$ in AND gate 158 and gated through NOR gate 160 to set SENDID latch 162 as shown in FIG. 11. SENDID is inverted by inverter 163 and fed to shift register 164 which brings up SENDIDD1 at the next clock time. SENDID and $\overline{\text{SENDIDD1}}$ are anded in AND gate 165 and used to set latch OCLGEN labeled 166. OCLGEN is then inverted by inverter 167 and fed to shift register 168 which brings up OCLGEND1 at the next clock time. OCLGEN and $\overline{\text{OCLGEND1}}$ are then anded in AND gate 76 and gated through OR gate 79 to bring up RSTC for one clock time, which resets MARC to prepare MEMC for the ",IDE" OCL. OCLGEN and $\overline{\text{IDRCVD}}$ (which is true since we have not received an ID) are anded in AND gate 169 and gated through OR gate 172 to generate CR. CR is then fed to OCl generator labeled 27 on FIG. 5, which indicates that the ",IDE" should be terminated by a carriage return. OCLGEN and $\overline{\text{OCLGEND1}}$ are anded in AND gate 86 and gated through OR gate 87 to generate UPCTC which causes memory address register C to count up as each OCL character is gated onto data bus 2 as shown in FIG. 7. Referring to FIG. 5, the OCL generator then continues to gate the ",IDE carriage return" sequence onto the data bus and brings up STOP when the last character is on data bus 2. STOP is then inverted by inverter 324 to generate $\overline{\text{STOP}}$ which is used to reset OCLGEN latch 166 as shown in FIG. 11. This indicates that the ",IDE carriage return" sequence has been transferred into the communication buffer memory. $\overline{\text{OCLGEN}}$ and OCLGEND1 are combined in NAND gate 173 to set XFER latch 175. XFER is then inverted by inverter 176 and fed to shift register 177 which brings up XFERD1 at the next clock time.

Figure 9:
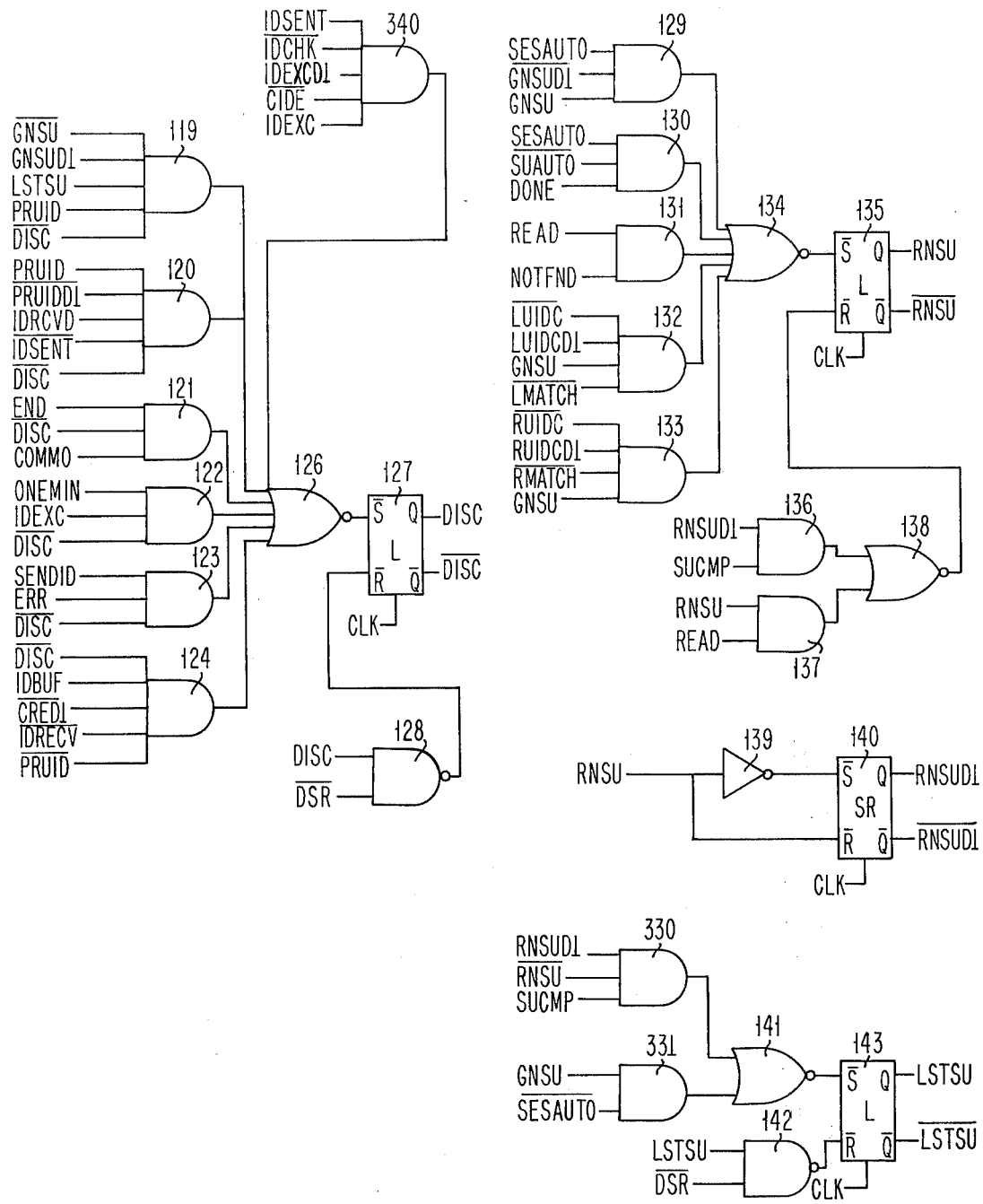

The XFER latch being set indicates that we are preparing to transfer the LUID from Memory 1 into Memory 2. This is accomplished in the following manner. Referring to FIG. 5, XFER and $\overline{\text{XFERD1}}$ are anded in AND gate 20 and gated through OR gate 22 to bring up SET1 for one clock time, which sets memory address register 1 to one which addresses the first byte of the LUID in Memory 1. XFER and $\overline{\text{XFERD1}}$ are also anded in AND gate 31 and gated through OR gate 32 to bring up RST2 for one clock time, which resets memory address register 2 to address the first byte of the LUID buffer in Memory 2. XFEr and XFERD1 are anded in AND gate 64 and gated through OR gate 65 to bring up READ1 which enables data to be read from Memory 1. XFER and XFERD1 are also anded in AND gate 72 and gated through OR gate 75 to bring up WRITE2 which enables the writing of data into Memory 2. XFER and XFERD1 are also anded in AND gate 45 gated through OR gate 46 to bring up UPCT1 which causes memory address register 1 to count up at each clock pulse. XFER and XFERD1 are also anded in AND gate 53 and gated through OR gate 51 to bring up UPCT2 which causes memory address register 2 to count up at each clock pulse. XFER and XFERD1 are also anded in AND gate 88 and gated through OR gate 87 to bring up UPCTC which causes memory address register C to count up at each clock pulse. Referring to FIG. 5, READ1, WRITE2 and $\overline{\text{COMMA}}$ are anded in AND gate 14 and gated through OR gate 16 to bring up GATE12 which enables data to be transferred from data bus 1 to data bus 2 through AND gate 41. Now that READ1, WRITE2, UPCT1, UPCT2, UPCTC, GATE12 are all true, at each clock pulse one character of the LUID will be read from Memory 1 onto data bus 1, transferred to data bus 2, and written into Memory 2 and into Memory C in the communication system. Simultaneously on FIG. 11 OCLGEND1 and XFER are combined in OR gate 178 which brings up SEND which informs the communication system that we are preparing to send data. SEND and UPCTC are combined in AND gate 358 to bring up WRITEC which enables data on data bus 2 to be written into the communication system Memory C. This occurs every time SEND and UPCTC are brought up. When a comma on data bus 1 is detected by decode 1 labeled 56, it is inverted by inverter 55 to generate $\overline{\text{COMMA}}$ as shown in FIG. 6. Referring to FIG. 11, COMMA is anded with XFER in AND gate 183 and gated through OR gate 185 to generate DELIMIN which causes an ID delimiter to be encoded onto data bus 2 by encode 43. COMMA and XFER are also combined in NAND gate 174 to reset XFER latch 175. The resetting of this latch causes READ1, WRITE2, UPCT1, UPCT2, UPCTC and SEND to go down. When the communication system gets through sending the data, it bring up COMPLT. If an error was detected during sending the LUID, ERR is brought up simultaneously with COMPLT. This ERR signal is anded with SENDID and $\overline{\text{DISC}}$ in AND gate 123 and gated through NOR gate 126 to set DISC latch 127 as shown in FIG. 9. DISC is anded with IDEXC in AND gate 151 and gated through NOR gate 153 to reset IDEXC latch 154 as shown in FIG. 10. DISC is also gated through NOR gate 117 to reset DTR latch 116 as shown in FIG. 8. At this point the communications system drops the line which causes DSR to go down. $\overline{\text{DSR}}$ is then combined with DISC in NAND gate 128 which resets DISC latch 127 as shown in FIG. 9.

When DSR goes down, $\overline{\text{DSR}}$ is also anded with DSRD1 and COMMO in AND gate 2 which is gated through OR gate 3 to bring up the START signal. This resets the system in the same manner as the START key did as described earlier.

If an error did not occur when COMPLT is brought up by the communication system, COMPLT is combined with SENDID in NAND gate 179 to set IDSENT latch 181 as shwon in FIG. 11. This latch indicates that the LUID has been sent. At this point IDEXC latch 154 is still set which indicates that we are still in an ID exchange mode, and IDSENT latch 181 set indicates we have sent our LUID. IDRCVD latch 213 is reset which says that we have not received an RUID. Therefore, the system will wait for an RUID to be received. During this time, timer labeled 6, which was reset at the completion of sending the LUID by anding $\overline{\text{SENDID}}$ with SENDIDD1 in AND gate 327 and gated through OR gate 329 to bring up RSTIMR for once clock tinme, is enabled by RUNTIMR, which is brought up by anding IDEXCD1, $\overline{\text{SENDID}}$, and $\overline{\text{PRUID}}$ in AND gate 157 as shown in FIG. 10. This allows the timer to run during the "ID exchange" mode except while actually sending the LUID or processing an RUID. If an RUID is not received within one minute, decode 7 will decode from the timer and bring up ONEMIN. This signal will be anded with IDEXC and $\overline{\text{DISC}}$ in AND gate 122 gated through NOR gate 126 to set DISC latch 127 as shown in FIG. 9. The communications system has now been told to disconnected from the line and operates in the same manner as the disconnect described earlier.

Figure 12:
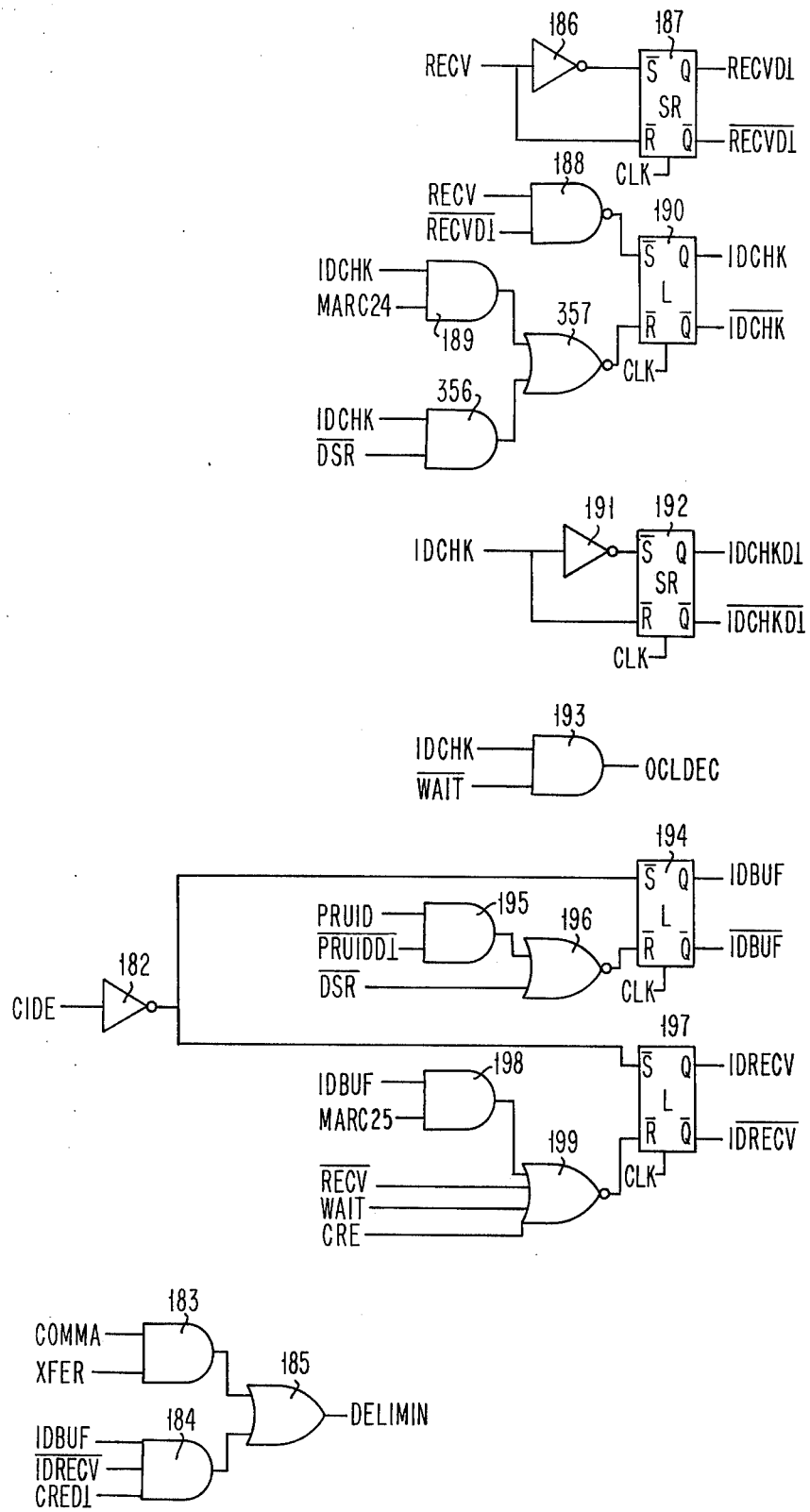
Figure 13:
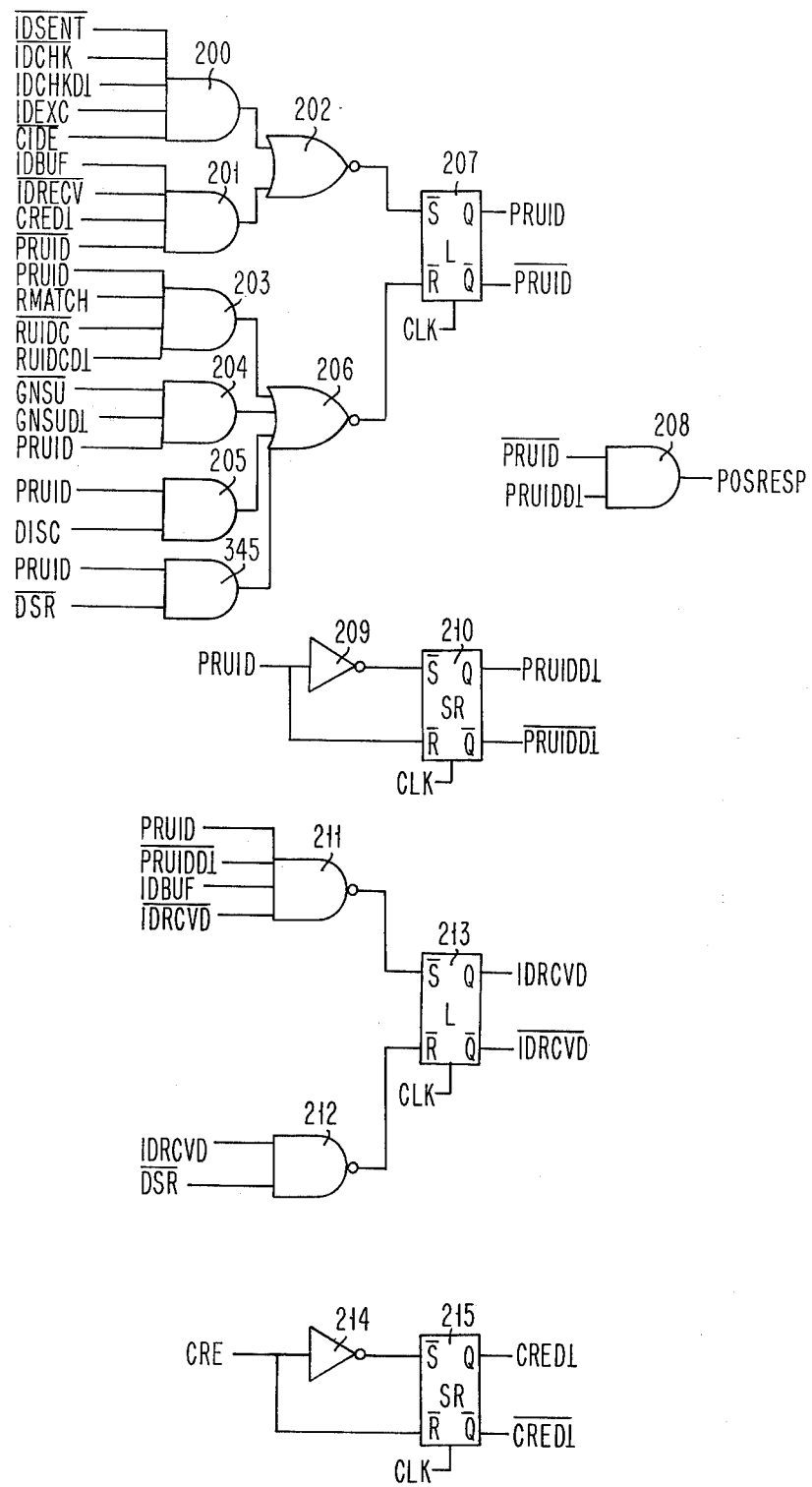

If the communication system receives a buffer from the communication line prior to the one minute timeout, the communication system brings up RECV which is inverted through 91 to generate $\overline{\text{RECV}}$. RECV is also inverted by inverter 186 and fed to shift register 187 which brings up RECVD1 at the next clock time as shown in FIG. 12. Now that there is a receive buffer in the communication memory, the first thing that needs to be done is a check for the ",IDE" OCL. This is done in the following manner. RECV is anded with $\overline{\text{RECVD1}}$ in AND gate 77 and gated through OR gate 79 to bring up RSTC for one clock time, which resets memory address register C to the beginning of the data in MEMC. RECB is also combined with $\overline{\text{RECVD1}}$ in NAND gate 188 and used to set IDCHK latch 190. IDCHK is then inverted by inverter 191 and fed to shift register 192 which brings up IDCHKD1 at the next clock time. These two latches control the scan for the ,IDE OCL. IDCHK is anded with $\overline{\text{WAIT}}$ in AND gate 193 to bring up OCLDEC which causes OCL decoder labeled 25 to begin a scan for the sequence ,IDE index. The index is indicated by CR being false. This signal is false since IDSENT is true, and IDRCVD and OCL-GEN are false. IDCHK is also anded with $\overline{\text{WAIT}}$ in AND gate 85 and gated through OR gate 87 to bring up UPCTC as shown in FIG. 7. UPCTC causes memory address register C to count up at each clock pulse. RECV is combined with UPCTC in AND gate 359 to bring up READC which enables data in MEMC to be read onto data bus 2. This occurs every time UPCTC and RECV are brought up. When memory address register C reaches a value of 4, MARC4 is brought up. MARC4 is anded with IDCHK in AND gate 189 and gated through NOR gate 357 to reset IDCHK latch 190 as shown in FIG. 12. At the next clock time, when IDCHK is false and IDCHKD1 is true, if a valid ",IDE index" sequence was not decoded, CIDE generated by OCL decoder 25 will be false which will be inverted by inverter 26 and cause $\overline{\text{CIDE}}$ to be true. In this case, referring to FIG. 9, $\overline{\text{CIDE}}$ is anded with $\overline{\text{IDCHK}}$, iDCHKD1, IDEXC and IDSENT in AND gate 340 which is gated through NOR gate 126 to set DISC latch 127 which causes the communication system to disconnected as described earlier. On the other hand if a valid ",IDE index" was decoded, CIDE generated by OCL decoder 25 will be true. CIDE is gated through OR gate 233 to bring up SETR2 which resets memory address register 2 to address the first byte of Memory 2 where the RUID is to be written. CIDE is then inverted by inverter 182 and used to set IDBUF latch 194 and IDRECV latch 197 as shown in FIG. 12. The IDBUF latch will be used to set IDRCVD latch when processing the RUID. The IDRECV latch controls the transfer of the received RUID into Memory 2. This is done in the following manner. Referring to FIG. 7, IDRECV is anded with RECV in AND gate 84 and gated through OR gate 87 to bring UPCTC which causes the memory address register C to contiue to count up. IDRECV is anded with RECV and $\overline{\text{CRE}}$ in AND gate 50 and gated through OR gate 51 to bring up UPCT2 which causes memory address register 2 to continue to count up. IDRECV is also anded with RECV in AND gate 73 and gated through OR gate 75 to bring up WRITE2 which enables writing of the RUID in Memory 2. This process continues until IDRECV latch 197 is reset. Referring to FIG. 12, this latch can get set in a number of ways if the communication system brings up WAIT or drops RECV. Dropping RECV this indicates the end of the communication buffer. These two signals are combined in OR gate 199 and used to reset IDRECV. Another case is when memory address register C reaches a count of 25 which indicates the maximum RUID length allowed. When this happens, MARC 25 is brought up out of MARC. This signal is anded with IDBUF in AND gate 198 and gated through NOR gate 199 and used to reset IDRECV latch 197. The last case is when a CRE is decoded on data bus 2 by decode 2 labeled 61. The CRE is gated through nor gate 199 and used to reset IDRECV latch 197. The CRE signal is also inverted by inverter 214 and fed to shift register 215 which brings up CRED1 at the next clock time as shown in FIG. 13. When CRE comes true, it also causes UPCTC and UPCT2 to stop countinhg up since $\overline{\text{CRE}}$ was used in the generation of UPTC12 and UPCTC. This causes memory address register 2 to continue to address the byte of Memory 2 where the carriage return was written. At this time, CRED1 is anded with IDBUF and $\overline{\text{IDRECV}}$ in AND gate 184 and gated through OR gate 185 to bring DELIMIN as shown in FIG. 11. This causes an ID delimiter to be encoded on data bus 2 by encode 43. CRED1 is also anded with IDBUF and $\overline{\text{IDRECV}}$ in AND gate 74 and gated through Or gate 75 to maintain WRITE2 true for one more clock time to enable the ID delimiter to be written into Memory 2 as shown in FIG. 6. For the RUID buffer to be valid, it must end in a carriage return. Therefore, if a CRE was not decoded when IDRECV latch was brought down, a disconnect is generated. This is done by anding $\overline{\text{CRED1}}$ with the $\overline{\text{DISC}}$, IDBUF, $\overline{\text{IDRECV}}$, and PRUID in AND gate 124 through NOR gate 126 to set the DISC latch 127 as shown in FIG. 9. This causes the communication system to disconnect as previously described.

Figure 14:
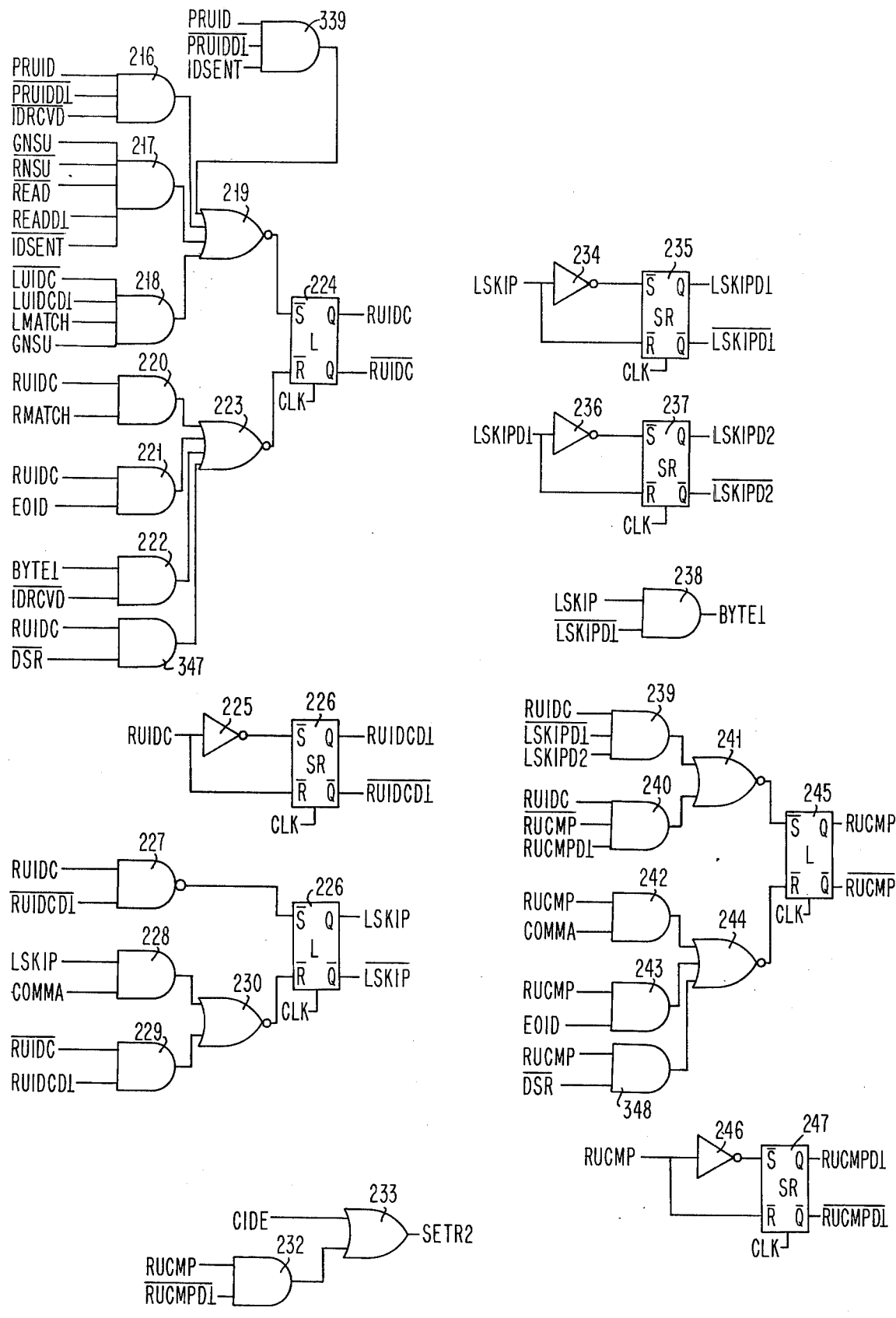
Figure 15:
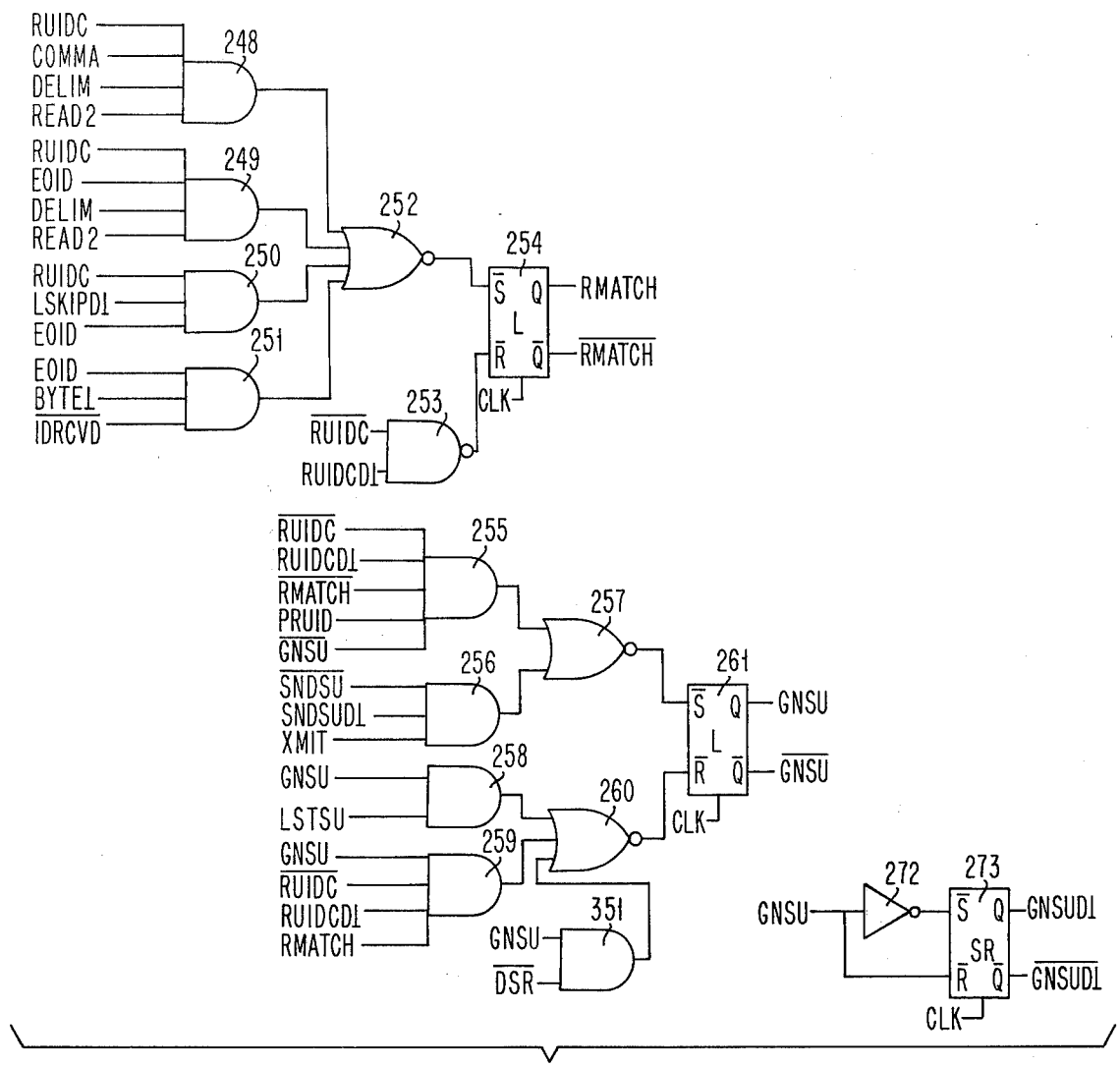

If a CRE was decoded, we process the RUID that we received. This process is controlled by PRUID latch 207 as shown in FIG. 15. CRED1 is anded with IDBUF, $\overline{\text{IDRECV}}$, and $\overline{\text{PRUID}}$ in AND gate 201 and gated through NOR gate 202 to set the PRUID latch 207. PRUID is then inverted by inverter 209 and fed to shift register 210 to bring up PRUIDD1 at the next clock time. PRUID is also combined with $\overline{\text{PRUIDD1}}$, IDBUF, and $\overline{\text{IDRCVD}}$ in NAND gate 211 and used to set IDRCVD latch 213. At the same time PRUID is anded with $\overline{\text{PRUIDD1}}$ in AND gate 95 and gated through NOR gate 196 to reset IDBUF latch 194 as shown in FIG. 12. At the same time PRUID is anded with PRUIDD1 and $\overline{\text{IDRCVD}}$ in AND gate 216 and gated through NOR gate 219 to set RUIDC latch 224 as shown in FIG. 14. This latch controls the comparing of the received RUID with the list of RUIDs in the setup in Memory 1. RUIDC is inverted by inverter 225 and fed to shift register 226 to bring up RUIDCD1 at the next clock time.

Since the LUID is variable length field, the LUID must be scanned to find the end of the LUID and the beginning of the first RUID. This is indicated by a comma if there are RUIDs or an EOID if there are not RUIDs. The scanning over the LUID is controlled by LSKIP latch 231, and is accomplished in the following manner.

Referring to FIG. 5, RUIDC is anded with $\overline{\text{RUIDCD1}}$ in AND gate 21 and gated through OR gate 22 to bring up SET1 which initializes memory address register 1 to the first byte of the LUID field. RUIDC is also combined with $\overline{\text{RUIDCD1}}$ in AND gate 227 and used to set LSKIP latch 231 as shown in FIG. 14. LSKIP is then inverted by inverter 234 and fed to shift register 235 to bring LSKIPD1 at the next clock time. LSKIPD1 is inverted by inverter 236 and fed to shift register 237 to bring up LSKIPD2 at the next clock time. Referring to FIG. 6, LSKIP is gated through OR gate 46 to bring up UPCT1 which causes the memory address register 1 to count up at each clock time. LSKIP is also combined with LSKIPD1 in OR gate 65 to bring READ1 which enables reading of the LUID from Memory 1. The inclusion of LSKIPD1 in this term allows READ1 to remain up for one clock time longer than UPCT1. This allows checking for EOID after a comma without bumping MAR1 past the first byte of the first RUID if one was present. When a comma is decoded by decode 1 labeled 56 during the scanning operation, COMMA is anded with LSKIP in AND gate 228 and gated through NOR gate 230 to reset LSKIP latch 231 as shown in FIG. 14. If an EOID is decoded at any time prior to decoding the comma or during the next clock time after the comma, it indicates that no RUIDs are present, and therefore, any received remote user ID is acceptable. Therefore, EOID is anded with LSKIPD1 and RUIDC in AND gate 250 and gated through NOR gate 252 to set RMATCH latch 254 as shown in FIG. 15. Referring to FIG. 14, EOID is also anded with RUIDC in AND gate 221 and gated through NOR gate 223 to reset RUIDC latch 224 to indicate the end of the RUID compare. $\overline{\text{RUIDC}}$ is then anded with RUICD1 in AND gate 229 and gated through NOR gate 230 to reset LSKIP latch 231.

Consider the case that there were RUIDs present. In this case after the comma was decoded, an EOID would not have been found, and therefore, the RUIDC latch 224 would not have been reset. In this case RUIDC, $\overline{\text{LSKIPD1}}$, and LSKIPD2 anded in AND gate 239 and gated NOR gate 241 would set RUCMP 245. This latch is used to control the comparing of one RUID from the list in Memory 1 with the RUID in Memory 2. This mode is ended by resetting RUCMP latch 245 when either a comma or EOID is decoded on data bus 1. This is done by anding COMMA with RUCMP in AND gate 242 and gating through NOR gate 244 to reset RUCMP latch 245, and by anding RUCMP and EOID in AND gate 243 and gating through NOR gate 244 to reset RUCMP latch 245.

Figure 16:
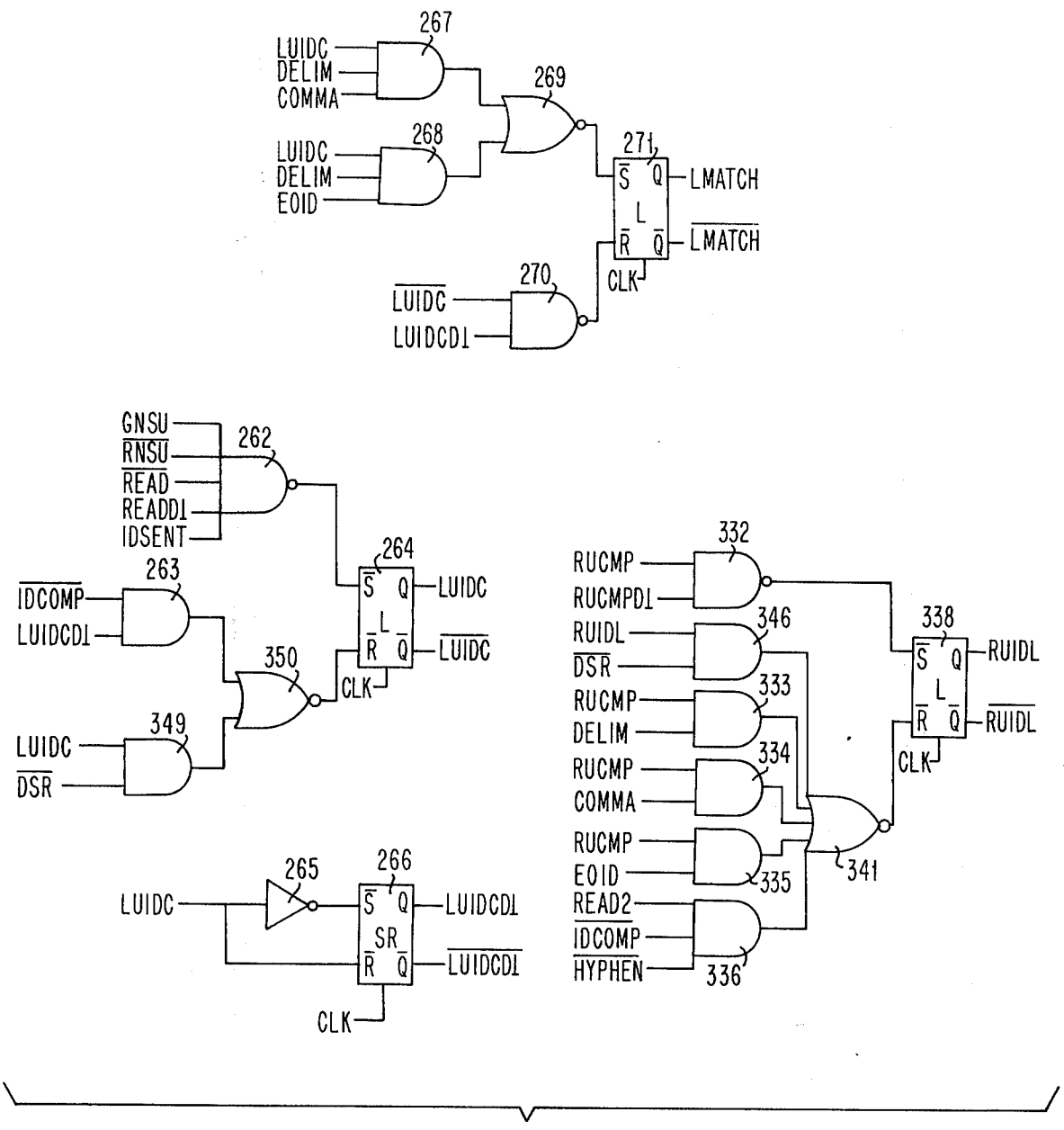

The actual compare is done as follows. RUCMP is inverted by interter 246 and fed to shift register 247 to bring up RUCMPD1 at the next clock time. RUCMP is anded with $\overline{\text{RUCMPD1}}$ in AND gate 232 and gated through OR gate 233 to bring up SETR2 for one clock time, which presets memory address register 2 to the first byte of RUID in Memory 2. Referring to FIG. 6, RUCMP is anded with RUCMPD1 in AND gate 66 and gated through OR gate 65 to bring up READ1 which enables reading from Memory 1. RUCMP is also anded with RUCMPD1 in AND gate 47 and gated through OR gate 46 to bring up UPCT1 which enables memory address register 1 to count up at each clock pulse. READ1 and UPCT1 will then remain up until a comma or EOID is decoded on data bus 1 by decode 1 labeled 56. Referring to FIG. 16, RUCMP and $\overline{\text{RUCMPD1}}$ are combined in NAND gate 332 to set RUIDL latch 338. Referring to FIG. 6, RUIDL is then gated through OR gate 70 to bring up READ2 amd through OR gate 51 to bing up UPCT2. READ2 and UPCT2 both up enables the reading of the RUID from Memory 2 onto data bus 2. Thus, the RUID from Memory 1 and the RUID from Memory 2 are both read simultaneously and placed on data bus 1 and data bus 2 respectively. These are compared by compare 59 which brings up IDCOMP as long as the two RUIDs are equal. When any mismatch occurs between the two RUIDs, IDCOMP will go down. Since the RUID in Memory 1 is terminated by a comma or an EOID, and the RUID in Memory 2 is terminated by a delimiter, a mismatch will always occur at the end of the RUID compare. If the two RUIDs were actually equal, a DELIM should be decoded on data bus 2 at the same time that a comma or an EOID is decoded on data bus 1. Either of these conditions indicate a successful compare which will be indicated by setting RMATCH latch 254 as shown in FIG. 15. This is accomplished by anding RUIDC, COMMA, DELIM, and READ2 in AND gate 248 and gating through NOR gate 252 to set RMATCH latch 254 and by combining RUIDC, EOID, DELIM, and READ2 in AND gate 249 and gating through NOR gate 252 to set RMATCH latch 254.

If RMATCH gets set by the terms in AND gate 248, an EOID will not have been decoded yet. In this case, the "RUID compare" mode is terminated by anding RUIDC with RMATCH in AND gate 220 and gated through NOR gate 223 to reset RUIDC latch 224 as shown in FIG. 14. Referring to FIG. 16, the reading of the RUID from Memory 2 is stopped by resetting RUIDL latch 338 when a DELIM is decoded on data bus 2 or a comma or an EOID is decoded on data bus 1. This is done by anding RUCMP with DELIM in AND gate 333, anding RUCMP with COMMA in AND gate 334, anding RUCMP with EOID in AND gate 335, and combining these three terms through NOR gate 341 and using this to reset RUIDL latch 338. This latch is also reset whenever a mismatch is found indicated by $\overline{\text{ID-COMP}}$ coming true unless a hyphen decoded on data bus 1 during the same clock time that $\overline{\text{IDCOMP}}$ came true. This is accomplished by anding READ2, $\overline{\text{ID-COMP}}$, and $\overline{\text{HYPHEN}}$ in AND gate 336 gating through NOR gate 341 to reset RUIDL latch 338.

Consider the case that a successful compare was not obtained on the first RUID in the list in Memory 1 and that there is another RUID in this list This means that the comma which separates the two RUIDs will be decoded by decode 1 labeled 56 and, COMMA will be anded with RUCMP in AND gate 242 gated through NOR gate 244 to reset RUCMP latch 245 as shown in FIG. 14. At the next clock time, RMATCH latch 254 is still reset and no EOID was decoded on data bus 1. RUIDC latch 224 will still be set. RUIDC is then anded with $\overline{\text{RUCMP}}$ and RUCMPD1 in AND gate 240 and gated through NOR gate 241 to set RUCMP latch 254 again. At this point memory address register 1 will be addressing the first byte of the second RUID in Memory 1. SETR2 is brought true for one clock time again by anding RUCMP and $\overline{\text{RUCMPD1}}$ in AND gate 232 and gating through OR gate 233 as described earlier. This resets memory address register 2 to the first byte of the RUID in Memory 2. The RUID compare then repeats in the same manner as described, only this time using the second RUID in the list in Memory 1.

Consider the case that this is the last RUID in the list in this setup, and that a match is not found on this RUID either. The EOID at the end of the list will be decoded by decode 1 labeled 56 which will bring EOID true. EOID is then anded with RUCMP in AND gate 243 and gated through NOR gate 244 to reset RUCMP latch 245. EOID is also ANDED with RUIDC in AND gate 221 and gated through NOR gate 223 to reset UIDC latch 224. The resetting of this latch indicates the emd of the "RUID compare" mode for this setup. Since a maktch was not found, RMATCH latch 254 will not be set at this time. Therefore, anding $\overline{\text{RUIDC}}$, RUIDCD1, $\overline{\text{RMATCH}}$, PRUID and $\overline{\text{GNSU}}$ in AND gate 255 and gating through NOR gate 257 will set GNSU latch 261 as shown in FIG. 15.

The setting of the GNSU latch generates a sequence of events which will read the next setup from the media system into Memory 1. A compare will be made on the LUID in this set up with the LUID in Memory 2. If these match, a compare will be then made on the RUID in Memory 2 with a list of RUIDs in Memory 1. If either the LUID compare or the RUID compare fails to match, the next setup will be read into Memory 1 and the sequence is repeated. This will continue until either a match is found or the last setup has been read. If the last setup has been read without a match being found, LSTSU latch 143 will be set. This indicates that the received RUID is not valid. If this latch is not set, this indicates that a match has been found in the received RUID is valid.

This sequence of events, sometimes referred to as the "get next steup" mode, is accomplished in the following manner. GNSU is inverted in inverter 272 and fed to shift register 273 to bring up GNSUD1 at the next clock time. If the starting setup did not have "auto-linking" specified, SESAUTO latch 110 on FIG. 8 will not be set which means $\overline{\text{SESAUTO}}$ is true. $\overline{\text{SESAUTO}}$ is then anded with GNSU in AND gate 331 and gated through NOR gate 141 to set LSTSU latch 143 as shown in FIG. 9. GNSU is then anded with LSTSU in AND gate 258 and gated through NOR gate 260 rest GNSU latch 261 as shown in FIG. 15. This would end the "get next setup" mode as described above with LSTSU latch 143 set indicating the received RUID was invalid. In this case, referring to FIG. 9, $\overline{\text{GNSU}}$, GNSUD1, LSTSU, PRUID and $\overline{\text{DISC}}$ are anded in AND gate 119 and gated through NOR gate 126 to set DISC latch 127 which will cause the communication system to disconnect as described previously.

If, however, the starting setup did have "auto-linkin" specified, SESAUTO latch 110 will be set. SESAUTO, GNSU and $\overline{\text{GNSUD1}}$ are anded in AND gate 129 and gated through the NOR gate 134 to set RNSU latch 135 as shown in FIG. 9. RNSU is then inverted by inverter 139 and fed to shift register 140 to bring RNSUD1 at the next clock time. RNSU is anded with $\overline{\text{RNSUD1}}$ in AND gate 17 to bring up SETUPCNT for one clock time as shown in FIG. 5. This causes setup counter 11 to increase by one. This is fed into the media system to indicate which setup is to be read when READM is brought up. Now that the setup counter has been bumped and is no longer equal to the starting setup register SUCMP generated by compare 12 is not true. This is inverted by inverter 13 making $\overline{\text{SUCMP}}$ true. $\overline{\text{SUCMP}}$ is anded with RNSUD1 in AND gate 97 and gated through NOR gate 98 to set READ latch 99 as shown in FIG. 6. READ is then gated through OR gate 18 to bring up READM to the media system as shown in FIG. 5. Referring to FIG. 8, READ is also inverted by inverter 101 and fed to shift register 102 to bring up READD1 at the next clock time. Additonally, READ is anded with RNSU in AND gate 137 and gated through NOR gate 138 to reset RNSU latch 135 as shown in FIG. 9. The reading of this setup now works as was described for the reading for the starting setup with the exception that SUCMP was true when the starting setup was read and it is not true now.

Consider the case that the setup now being read did not have "auto-linking" specified. This means that SUAUTO will not be true when DONE comes true. DONE is anded with SESAUTO and $\overline{\text{SUAUTO}}$ in AND gate 130 and gated through NOR gate 134 to set RNSU latch 135 again. This repeats the "read next setup" sequence just described.

Another setup is read from the media system. Consider the case that this setup has "auto-linking" specified. Therefore, RNSU latch 135 will not be set when read goes down because SUAUTO will be true. Referring to FIG. 16, GNSU is then combined with $\overline{\text{RNSU}}$, READ, READD1 and IDSENT in NAND gate 262 and used to set LUIDC latch 264. This latch being set causes the LUID in the setup in Memory 1 to be compared with the LUID in Memory 2 which is the one that was sent. LUIDC is then inverted by inverter 265 and fed to shift register 266 to bring LUIDC1 at the next clock time. Referring to FIG. 5, LUIDC and $\overline{\text{LUIDCD1}}$ are anded in AND gate 326 and gated through OR gate 22 to bring up SET1 which sets memory address 1 to the first byte of the LUID in Memory 1. LUIDC is also anded with $\overline{\text{LUIDCD1}}$ in AND gate 342 and gated through OR gate 32 to bring up RST2 which resets memory address register 2 which causes it to address the first byte of LUID buffer in Memory 2. Referring to FIG. 6, LUIDC is anded with LUIDCD1 in AND gate 44 and gated through OR gate 46 to bring up UPCT1 which allows memory address register 1 to count up at each clock pulse. LUIDC and LUIDCD1 are also anded in AND gate 52 and gated through OR gate 51 to bring up UPCT2 which allows memory address register 2 to count up at each clock time. LUIDC and LUIDCD1 are also anded in AND gate 67 and gated through OR gate 65 to bring up READ1 which enables reading from Memory 1. LUIDC and LUIDCD1 are also anded in AND gate 71 and gated through OR gate 70 to bring up READ2 which enables reading from Memory 2. Thus, UPCT1, UPCT2, READ1, and READ2 are all true which causes simultaneous reading of the LUID from Memory 1 and LUID from Memory 2 with the contents of each memory being placed on data bus 1 and data bus 2 respectively. These are compared through compare 59 which generates IDCOMP. This signal will be true as long as the contents of the two LUIDs compare. When any mismatch is found between the LUIDs, IDCOMP which is generated by a compare 59 will become false. This is inverted by inverter 60 causing $\overline{\text{IDCOMP}}$ to be true. Referring to FIG. 16 $\overline{\text{IDCOMP}}$ is combined with LUIDCD1 in AND gate 263 and gated through OR gate 350 to reset LUIDC latch 264. For the two LUIDs to match, a delimiter must be decoded on data bus 2 by decode 2 labeled 61 at the same time that a comma or an EOID is decoded on data bus 1 by decode 1 labeled 56. For either of these cases LMATCH latch 27 is set to indicate a match. LUIDC, DELIM and COMMA are anded in AND gate 267 and gated through NOR gate 269 to set LMATCH latch 271. LUIDC, DELIM and EOID are also anded in AND gate 268 and gated through NOR gate 269 to set LMATCH 271.

If a match was not found, LMATCH latch 271 will not be set. In this case $\overline{\text{LMATCH}}$ is anded with $\overline{\text{LUIDC}}$, LUIDCD1 and GNSU in AND gate 132 and gated through NOR gate 134 to set RNSu latch 135 as shown in FIG. 9. The setting of this latch causes the next setup to read from the media system as described previously. LUIDC will be set again, and the LUID in this setup is again compared with the LUID in Memory 2. Referring to FIG. 16, assuming that a match is found in this setup, LMATCH latch 271 will be set during the clock time when LUIDC latch 264 is reset and LUIDCD1 is true. $\overline{\text{LUIDC}}$ and LUIDCD1 are combined in NAND gate 270 to reset LMATCH latch 271. At the same time $\overline{\text{LUIDC}}$, LUIDCD1, LMATCH and GNSU are anded in AND gate 218 and gated throughout NOR gate 219 to set RUIDC latch 224 as shown in FIG. 14. The setting of this latch causes the RUID in Memory 2 to be compared with the list of RUIDs in the setup in Memory 1 as described previously. If a match is not found, RMATCH latch 254 will not be set during the time where RUIDC is false and RUIDCD1 is true. In this case, $\overline{\text{RMATCH}}$, $\overline{\text{RUIDC}}$, RUIDCDI and GNSU are anded in AND gate 133 and gated through NOR gate 134 to set RNSU latch 135 as shown in FIG. 9. The setting of this latch again causes the next setup to be read from the media system. The LUIDs will again be compared, and, if they match, the RUIDs will be compared. Referring to FIG. 15, if we assume that a match was found in RUID list in this setup, then RMATCH latch 254 will be set during the time that RUIDC is false and RUIDCD1 is true. In this case RMATCH, $\overline{\text{RUIDC}}$, RUIDCD1 and GNSU are anded in AND gate 259 and gated through NOR gate 260 to reset GNSU latch 261. At the same time $\overline{\text{RUIDC}}$ and RUIDCD1 are combined in NAND gate 253 to reset RMATCH latch 254. The resetting of GNSU latch 261 indicates the end of the "get next setup" mode. At this time, since a match was found, LSTSU latch 143 in FIG. 9 did not get set indicating that the received RUID is acceptable. $\overline{\text{GNSU}}$ and GNSUD1 which indicate the end of the "get next setup" mode, are anded with PRUID in AND gate 204 and gated through NOR gate 206 to reset PRUID latch 207 in FIG. 13 indicate the end of processing RUID. Since we have already sent our LUID, IDSENT latch 181 in FIG. 11 is set. $\overline{PRUID}$ and PRUIDD1, which indicate the end of processing the RUID, are anded with IDSENT in AND gate 149 and gated through NOR gate 153 to reset IDEXC latch 154 in FIG. 10 indicating the end of ID exchange mode. Additionally, $\overline{PRUID}$ and PRUIDD1 are combined in AND gate 208 to bring up POSRESP to the communication system as shown in FIG. 13. $\overline{PRUID}$ and PRUIDD1 are also combined in AND gate 328 and gated through OR gate 329 to bring up RSTIMR in FIG. 10 for one clock time, which resets timer 6 in FIG. 5.

Figure 17:
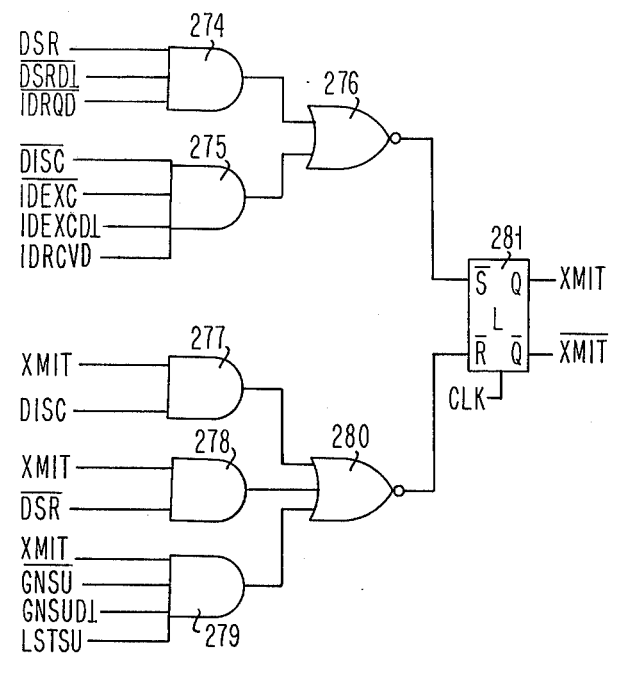
Figure 17:
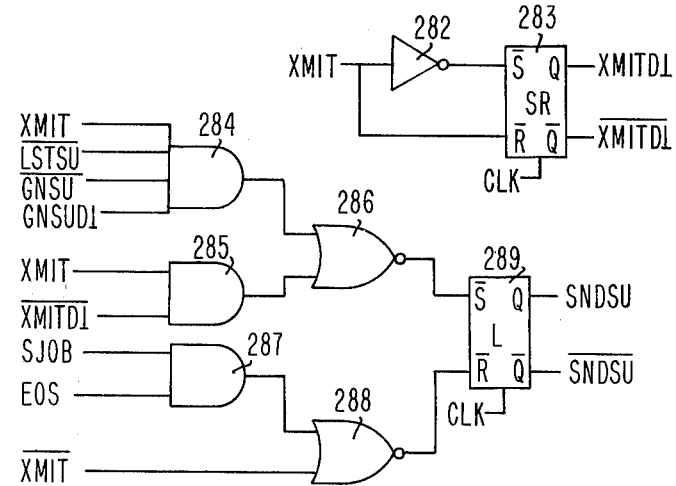
Figure 17:
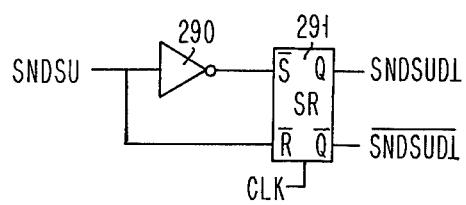
Figure 18:
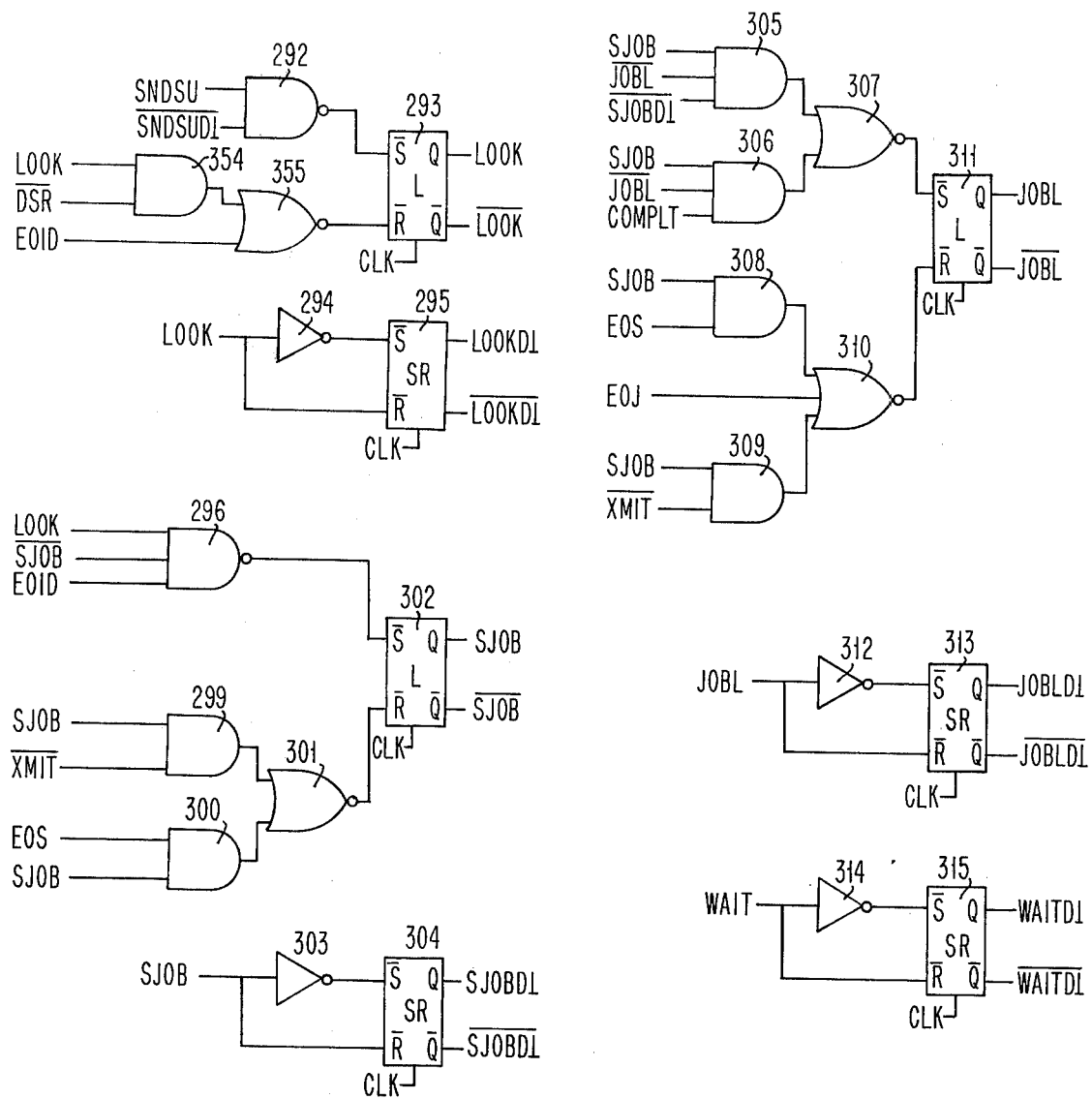

Referring to FIG. 17 $\overline{INDEXC}$ and IDESCD1 which indicate the end of the ID exchange mode are anded with $\overline{DISC}$ and IDRCVD in AND gate 275 and gated through NOR gate 276 to set the XMIT latch 281. The setting of this latch causes the "transmit" mode to be entered. In this mode all of the jobs from the current setup are sent, and then "get next setup", mode will be entered to determine if there are any more setups with matching LUIDs and RUIDs and jobs to be sent. If there are, these jobs will also be sent. The transmit mode will be terminated only after LSTSU latch 143 is set, a disconnect is sent or DSR dropped. XMIT is inverted by inverter 282 and fed to shift register 283 to bring up XMITD1 at the next clock time. XMIT is anded with $\overline{XMITD1}$ in AND gate 285 and gated through NOR gate 286 to set SNDSU latch 289. This latch controls the sending of the jobs from the current setup. SNDSU is inverted by inverter 290 and fed to shift register 291 to bring up SNDSUD1 at the next clock time. Referring to FIG. 18 SNDSU is combined with $\overline{SNDSUD1}$ in NAND gate 292 to set LOOK latch 293. This latch controls the searching for the EOID code to locate the first job indicator byte. LOOK is inverted by inverter 294 and fed to shift register 295 to bring up LOOKD1 at the next clock time. Referring to FIG. 5, LOOK is anded with $\overline{LOOKD1}$ in AND gate 30 and gated through OR gate 29 to bring up RST1 which resets memory address register 1 to the beginning of this setup in Memory 1. Referring to FIG. 6 LOOK is anded with LOOKD1 in AND gate 48 and gated through OR gate 46 to bring up UPCT1 which allows memory address register 1 to count up at each clock pulse. LOOK and LOOKD1 are also anded in AND gate 63 and gated through OR gate 65 to bring up READ1 which enables the reading from Memory 1. The contents of the setup are then canned until an EOID is decoded on data bus 1 by decode 1 labeled 56 to bring up EOID. Referring to FIG. 18 EOID is gated through OR gate 355 to reset LOOK latch 293 to terminate the search for the EOID by bringing UPCT1 and READ1 down. This leaves memory address register 1 addressing the first job byte. EOID is combined with LOOK and $\overline{SJOB}$ in NAND gate 296 to set SJOB latch 302. This latch remains set for the duration of sending the jobs in this setup. SJOB is inverted by inverter 303 and fed to shift register 304 to bring SJOBD1 at the next clock time. SJOB and $\overline{SJOBD1}$ are anded with $\overline{JOBL}$ in AND gate 305 and gated through NOR gate 307 to set JOBL latch 311. This latch controls the sending of one job from this setup. JOBL is inverted by inverter 312 and fed to shift register 313 to bring JOBLD1 at the next clock time. Referring to FIG. 11 JOBL is also gated through OR gate 178 to bring SEND on the communication system. Referring to FIG. 5 JOBL is also gated through OR gate 95 to bring JOBM on the media system.

Bringing up JOBM on the media system indicates that at the next clock time, data bus 1 will contain a 5 bit job indicator to indicate which job is to be retrieved from the media system. Referring to FIG. 6 JOBL is anded with bring $\overline{JOBLD1}$ in AND gate 68 and gated through OR gate 65 to bring up READ1 to enable reading the job indicator from Memory 1. JOBL is also anded with $\overline{JOBLD1}$ in AND gate 49 and gated through OR gate 46 to bring up UPCT1 for one clock time, which allows the memory address register 1 to address the next the job indicator. Referring to FIG. 7 JOBL is anded with $\overline{JOBLD1}$ in AND gate 80 and gated through OR gate 79 to bring up RSTC for one clock time, which resets memory address register C. JOBLD1 is anded with SJOB and $\overline{WAIT}$ in AND gate 19 and gated through OR gate 18 to bring up READM on the media system as shown in FIG. 5. This tells the media system to begin reading the job which was specified by the indicator on data bus 1 at the previous clock time. When the media system is ready to start gating data onto data bus 1, it brings up UPCNT1. UPCNT1 is then anded with SJOB and $\overline{WAIT}$ in AND gate 15 and gated through OR gate 16 to bring up GATE12. This allows the transfer of data from data bus 1 to data bus 2 though AND gate 41. Referring to FIG. 7 UPCNT1 is also anded with SJOB and $\overline{WAIT}$ in AND gate 83 and gated through OR gate 87 to bring UPCTC which allows memory address register C to count up to each clock pulse. When the communication memory MEMC becomes full, the communication system brings up WAIT which is inverted by inverter 90 to generate $\overline{WAIT}$. WAIT is also inverted by inverter 314 and fed to shift register 315 to bring up WAITD1 at the next clock pulse as shown in FIG. 18. When WAIT comes up, it simultaneously brings UPCTC, GATE12, and READM down which causes the media system to temporarily stop putting data on data bus 1. Referring to FIG. 7 WAIT is anded with $\overline{WAITD1}$ in AND gate 81 and gated through OR gate 79 to bring RSTC for one clock time which resets memory address register C. When the media system finishes sending the data from its memory, WAIT is brought back down. This causes UPCTC, GATE12 and READM to come back up which causes the media system to resume putting data on data bus 1. When the media system detects the end of the job it brings EOJ up with the last character of the job. EOJ is gated through NOR gate 310 to reset JOBL latch 311 on FIG. 18 which causes JOBM and SEND to go down. Dropping SEND to the communication system informs the communication system that this is the end of the job. The communication system will send the remaining data in its memory. Upon completion of this, the communication system brings up COMPLT. COMPLT is then anded with SJOB and $\overline{JOBL}$ in AND gate 306 and gated through NOR gate 307 to set JOBL latch 311. Setting of the JOBL latch causes the next job indicator to be read from the setup in Memory 1 and indicates to the media system to send this job. This occurs in the same fashion as was described for the previous job. This process continues until the last job has been sent at which time an EOS is decoded by decode 1 labeled 56 and brings up EOS. This EOS is anded with SJOB in AND gate 308 and gated through NOR gate 310 to reset JOBL latch 311. This EOS is also anded with SJOB in AND gate 300 and gated through NOR gate 301 to reset SJOB latch 302.

The resetting of the SJOB latch indicates the end of sending the job(s) from the current setup. The EOS is also anded with SJOB in AND gate 287 and gated through NOR gate 288 to reset SNDSU latch 289 as shown in FIG. 17. $\overline{\text{SNDSU}}$ and SNDSUD1, which indicates the completion of the current setup, are anded with XMIT in AND gate 256 and gated through NOR gate 257 to set GNSU latch 261 as shown in FIG. 15. The setting of this latch causes the next setup to be read from the media system and checked for LUID and RUID matches as described previously. If a setup is found in which the LUIDs and RUIDs match, LSTSU latch 143 will not be set when the "get next setup" mode is ended indicated by GNSU latch 261 being reset. Therefore, $\overline{\text{LSTSU}}$ is anded with $\overline{\text{GNSU}}$, GNSUD1 and XMIT in AND gate 284 and gated through NOR gate 286 to set SNDSU latch 289 as shown in FIG. 17. The setting of this latch causes the job(s) in this setup to be sent in the same manner as described with the previous setup. When this is completed, GNSU latch 261 will again be set to cause the next setup to be read. This process will continue until all valid setups have been processed. At this time LSTSU latch 143 in FIG. 9 will be set when GNSU latch 261 is reset. Referring to FIG. 17, LSTSU is then anded with $\overline{\text{GNSU}}$ and GNSUD1 and XMIT in AND gate 279 and gated through NOR gate 280 to reset XMIT latch. The resetting of this latch indicates the end of the transmit mode.

Figure 19:
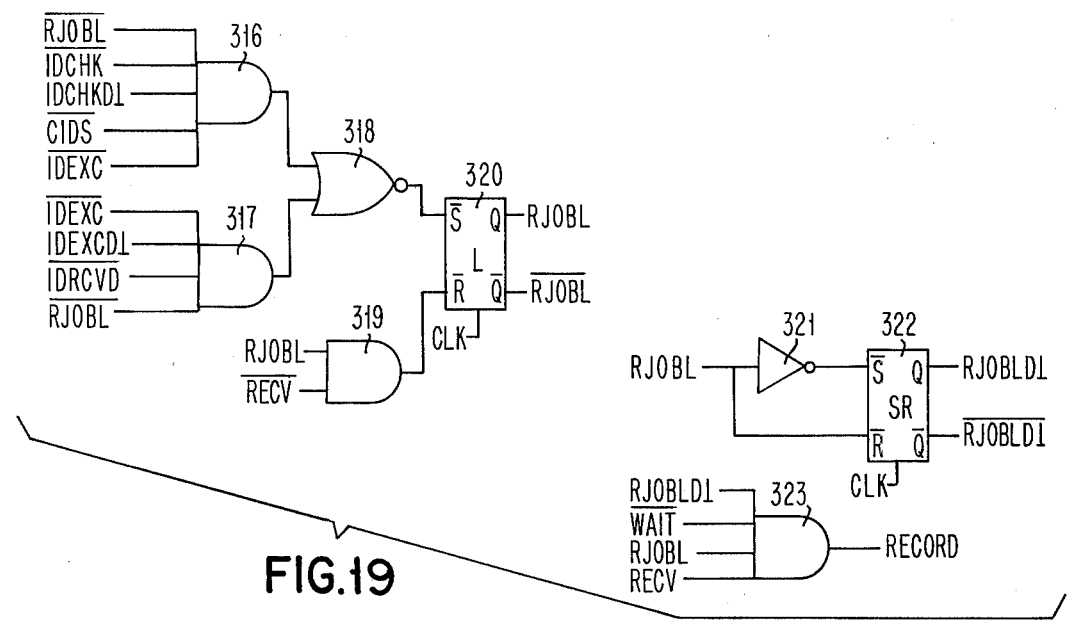

At this time the system will remain in this condition until either DSR goes down or the END key is pushed or a job is received by the communication system. If a job is received by the communication system, RECV is brought up. RECV is then inverted by inverter 186 and fed to shift register 187 which causes RECVD1 to be brought up at the next clock pulse as shown in FIG. 12. This initiates the "ID check" is executed as was described previously. In this case the assumption is made that a ",IDE" sequence is not decoded. This means that CIDE will be false at the termination of the "ID check" mode indicated by IDCHK being false and IDCHKD1 being true. Therefore, referring to FIG. 19, $\overline{\text{CIDE}}$ is anded with $\overline{\text{IDCHK}}$, IDCHKD1, $\overline{\text{IDEXC}}$, and $\overline{\text{RJOBL}}$ in AND gate 316 and gated through NOR gate 318 to set RJOBL latch 320. This latch controls the receiving of one job from the communication system. RJOBL is inverted by inverter 321 and fed to shift register 322 which brings up RJOBLD1 at the next clock time. Referring to FIG. 7 RJOBL is anded with RJOBLD1 in AND gate 78 and gated through OR gate 79 to bring up RSTC which resets memory address register C. Referring to FIG. 6, RJOBL is also anded with RJOBLD1, $\overline{\text{WAIT}}$, and RECV in AND gate 38 which brings up GATE21 which enables data to be transferred from data bus 2 to data bus 1 through AND gate 40. Referring to FIG. 19 RJOBL is also anded with RJOBLD1, $\overline{\text{WAIT}}$ and RECV in AND gate 323 which brings up RECORD to the media system. This informs the media system that data is to be gated onto data bus 1 to be recorded. Referring to FIG. 5 RJOBL is also gated through OR gate 95 to bring up JOBM to indicated to the media system that this is the beginning of a receive job.

Referring to FIG. 7, RJOBL is also anded with RJOBLD1, $\overline{\text{WAIT}}$, and RECV in AND gate 82 and gated through OR gate 87 to bring up UPCTC which enables memory address register C to count up at each clock pulse. When the last character is read from the communication memory, WAIT is brought up by the communication system. WAIT is inverted by inverter 314 and fed to shift register 315 which brings $\overline{\text{WAITD1}}$ at the next clock time. WAIT is anded with $\overline{\text{WAITD1}}$ in AND gate 81 and gated through OR gate 79 to bring up RSTC which resets memory address register C. When WAIT comes true it also causes GATE21, RECORD and UPCTC to temporarily go down. When the communication system receives more data and puts in Memory C, WAIT is brought back down. This allows GATE21, RECORD and UPCTD to come back up which allows more data to be transferred to the media system. When the communication system has received the last buffer and the last character is being read from this buffer, RECV is dropped by the communication system indicating the end of the job. RECV is inverted by inverter 91 to generate $\overline{\text{RECV}}$ which will be true. Referring to FIG. 19 $\overline{\text{RECV}}$ is then combined with RJOBL in NAND gate 319 to reset RJOBL latch 320. This indicates the end of the receive mode. If another job is received the communication system brings RECV up again and the cycle is repeated.

The system is now in a quiescent state waiting for either RECV to come up or $\overline{\text{DSR}}$ to come up, both of which are a function of the communication system, or for the operator to depress the END key on the keyboard. Referring to FIG. 5 when operator depresses END key on the keyboard, END is brought up which is inverted by inverter 5 to generate $\overline{\text{END}}$. $\overline{\text{END}}$ is used to reset COMMO latch 112 as shown in FIG. 8. $\overline{\text{END}}$ is anded with $\overline{\text{DISC}}$ and COMMO in AND gate 121 and gated through NOR gate 126 to set DISC latch 127 as shown in FIG. 9. This causes the communication system to disconnect as was described previously. When the communication system disconnects from the line, $\overline{\text{DSR}}$ is brought up. When $\overline{\text{DSR}}$ is brought up for any reason, the following occurs. $\overline{\text{DSR}}$ is anded with DSRD1 in AND gate 118 and gated through NOR gate 117 to reset DTR latch 116 as shown in FIG. 8. If the "ID exchange" mode is active, $\overline{\text{DSR}}$ is anded with IDEXC in AND gate 152 and gated through NOR gate 153 to reset IDEXC latch 154 as shown in FIG. 10. If the "send ID" mode is active, $\overline{\text{DSR}}$ is anded with SENDID in AND gate 344 and gated through NOR gate 161 to reset SENDID latch 162 as shown in FIG. 11. If a RUID is being processed, $\overline{\text{DSR}}$ is anded with PRUID in AND gate 345 and gated through NOR gate 206 to reset PRUID latch 207 as shown in FIG. 13. If a list of RUIDs are being compared, $\overline{\text{DSR}}$ is anded with RUIDC in AND gate 347 and gated through NOR gate 223 to reset RUIDC latch 224 as shown in FIG. 14. If one RUID is being compared, $\overline{\text{DSR}}$ is anded with RUCMP in AND gate 348 and gated through OR gate 244 to reset RUCMP latch 245. If a RUID is being read from Memory 2, $\overline{\text{DSR}}$ is anded with RUIDL in AND gate 346 and gated through NOR gate 341 to reset RUIDL latch 338 as shown in FIG. 16. If a LUID is being compared, $\overline{\text{DSR}}$ is anded with LUIDC in AND gate 349 and gated through NOR gate 350 to reset LUIDC latch 264. If a RUID has been received, $\overline{\text{DSR}}$ is combined with IDRCVD in NAND gate 212 to reset IDRCVD latch 213 as shown in FIG. 13. If the next setup is being retrieved, $\overline{\text{DSR}}$ is anded with GNSU in AND gate 351 and gated through NOR gate 260 to reset GNSU latch 261 as shown in FIG. 15. If a setup is being read, $\overline{\text{DSR}}$ is anded with READ in AND gate 352 and gated through NOR gate 353 to reset READ latch 99 as shown in FIG. 8. If the transmit mode is active, $\overline{DSR}$ is anded with XMIT in AND gate 278 and gated through NOR gate 280 to reset XMIT latch 281 as shown in FIG. 17. If the process of looking for the first job byte after the last ID is active, $\overline{DSR}$ is anded with LOOK in AND gate 354 and gate through NOR gate 355 to reset LOOK latch 293 as shown in FIG. 18. If the process of checking for a ",IDE" OCL is active, $\overline{DSR}$ is anded with IDCHK in AND gate 356 and gated through NOR gate 357 to reset IDCHK latch 190 as shown in FIG. 12.

If XMIT latch 281 is reset as the result DSR going down, $\overline{XMIT}$ is gated through NOR gate 288 to reset SNDSU latch 289 if it was set as shown in FIG. 17. $\overline{XMIT}$ IS also anded with SJOB in AND gate 299 and gated through NOR gate 301 to reset SJOB latch 302 if it is set as shown in FIG. 18. $\overline{XMIT}$ is also anded with SJOB in AND gate 309 and gated through NOR gate 310 to reset JOBL latch 311 if it is set.

If a disconnecte is generated for any reason while in the transmit mode, DISC is anded with XMIT in AND gate 277 and gated through NOR gate 280 to reset XMIT latch 281 as shown in FIG. 17. If a disconnect is generated for any reason while processing an RUID, DISCis anded with PRUID in AND gate 205 and gated through NOR gater 206 to reset PRUID latch 207 as shown in FIG. 13.

Assuming the communication system was started by the START key as described earlier, the starting setup has been read into Memory 1, DTR latch 116 has been set, and IDRQD latch 114 is also set indicating IDs are required as shown in FIG. 8. The following situations could occur. DSR is brought up by the communication system and $\overline{RI}$ from the communication system is not true indicating that we were the called party. IDEXC latch 154 in FIG. 10 will be set as described earlier to initiate the "ID exchange" mode. In this case, SENDID latch 162 in FIG. 11 will not be set because $\overline{RI}$ is not true. In this case the system will remain in a quiescent state waiting for the communication system to bring up RECV indicating that a buffer has been received. When RECV is brought up, it causes IDCHK latch 190 in FIG. 12 to be set initiating the check for ",IDE" OCL as described previously. Since the LUID has not been sent yet, the ",IDE" sequence must end in a carriage return. Referring to FIG. 11 this is specified by anding $\overline{IDSENT}$ with OCLDEC in AND gate 170 and gating through OR gate 172 to bring up CR to the OCL decoder 25 located in FIG. 5. Assuming that a valid ID buffer was received, PRUID latch 207 in FIG. 13 will be set to initiate the processing of the RUID buffer as described previously. RUIDC latch 224 in FIG. 14 will get set to initiate the compare of the received RUID with the list of RUIDs in the current setup. Assuming a match is found in the current setup, RMATCH latch 254 in FIG. 15 will be set when RUIDC latch 224 is reset indicating the end of the RUID compare. At this point $\overline{RUIDC}$, RUIDCD1, RMATCH and PRUID are anded in AND gate 203 and gated through NOR gate 206 to reset PRUID latch 207 as shown in FIG. 13. $\overline{PRUID}$ is then anded with PRUIDD1, IDSENT, IDRCVD, $\overline{DISC}$ and DSR in AND gate 159 and gated through NOR gate 160 to set SENDID latch 162 as shown in FIG. 11. Setting of this latch causes the LUID to be sent as described previously. When SENDID latch 162 is reset indicating completion of sending of the LUID, IDRCVD latch 213 in FIG. 13 is already set since we have already received an RUID. Therefore, $\overline{SENDID}$ is anded with SENDIDD1 and IDRCVD in AND gate 150 and gated through NOR gate 153 to reset INDEXC latch 154 as shown in FIG. 10. This indicates that the "ID exchange" mode is completed. From this point, the system operates in the same manner as described previously.

Having already completed a successful ID exchange, consider the case where the communication system brings up RECV again and the "ID check" mode is entered by setting IDCHK latch 190 in FIG. 12 as previously described. However, since IDSENT and IDRCVD are both true these two terms are anded with OCLDEC in AND gate 171 and gated through OR gate 172 to bring up CR in FIG. 11 into the OCL decode 25 located in FIG. 5. This indicates that we expect a carriage return following a ",IDE" sequence. Assuming that the "ID check" mode indicates that a valid ",IDE carriage return" was decoded, the RUID will be transferred into Memory 2 as previously described. Then PRUID latch 207 in FIG. 13 will be set to begin the processing of the RUID. PRUID, $\overline{PRUIDD1}$, and IDSENT are anded in AND gate 339 and gated through NOR gate 219 to set RUIDC latch 224 as shown in FIG. 14. Since the "ID exchange" mode is not active at this time, PRUID is also anded with PRUIDD1 and $\overline{IDEXC}$ in AND gate 147 and gated through NOR gate 148 to set IDEXC latch 154 as shown in FIG. 10. Setting this latch indicates that we are again in an "ID exchange" mode. IDEXC is combined with $\overline{INDEXCD1}$ and IDSENT in NAND gate 180 to reset IDSENT latch 181 as shown in FIG. 11. Resetting this latch indicates that even though we had previously sent a LUID, we have not sent one for the current exchange. From this point the ID exchange operates as previously described.

Now consider the case where a valid RUID buffer has been received and IDRCVD latch 213 is set. However, before we can send our LUID, the communication system brings up RECV indicating that another buffer has been received. Assuming that the "ID check" mode indicates that it is a valid ID buffer, the ID will be transferred into Memory 2 and PRUID latch 207 in FIG. 13 will be set as previously described. At the next clock time after PRUID latch 207 is set, PRUID, PRUIDD1, IDRECVD, $\overline{IDSENT}$ and $\overline{DISC}$ are anded in AND gate 120 and gated through NOR gate 126 to set DISC latch 127 as shown in FIG. 9. This causes the communication system to disconnect as previously described.

Consider the case where an RUID buffer is received which contains a valid ",IDE" OCL along with RUID, but the RUID is not terminated with a carriage return. This is an invalid RUID format and will cause a disconnect as follows. As the RUID is being transferred into Memory 2 as described previously, the CRE will not be decoded on data bus 2 by decode 2 labeled 61. Therefore, $\overline{CRED1}$ will remain true when IDRECV latch 197 in FIG. 12 is reset. At this time, $\overline{CRED1}$ will be anded with $\overline{IDRECV}$, $\overline{PRUID}$, IDBUF and $\overline{DISC}$ in AND gate 124 and gated through NOR gate 126 to set DISC latch 127 as shown in FIG. 9. This will cause the communication system to disconnect as described previously.

Now consider the case where there were no IDs present in the starting setup. Therefore, IDRQD latch 114 in FIG. 8 will not get set when reading the starting setup. In this case when DSR is brought up by the communication system, DSR, $\overline{DSRD1}$, and $\overline{IDRQD}$ are anded in AND gate 274 and gated through NOR gate 276 to set XMIT latch 281 as shown in FIG. 17. This enters the "transmit" mode without going through the "ID exchange" mode. Setting XMIT latch 281 causes the sending of any jobs in the setups to be sent.

Now consider the case where the communication system bring up RECV indicating that a buffer has been received before all the jobs have been sent. Assume that the "ID check" mode indicates that it is a valid RUID buffer. In this case the RUID will be transferred into Memory 2 and PRUID latch 207 in FIG. 13 will be set as previously described. RUIDC latch 224 in FIG. 14 will be set to compare the received RUID with the list of RUIDs in the current setup. Since there are no IDs in the current setup, a match will not be found. Therefore, GNSU latch 261 in FIG. 15 will be set as previously described to get the next setup. RNSU latch 135 in FIG. 9 will be set to read the next setup from the media. At the completion of reading the next setup, when RNSU is true, READ is true, and READD1 is true, LUIDC latch 264 in FIG. 16 will not be set because IDSENT is false. However, IDSENT is anded with READ, READD1, RNSU, and GNSU in AND gate 217 and gated through NOR gate 219 to set RUIDC latch 224 in FIG. 14 to compare the RUIDs. From this point on the system works as previously described.

Now consider another case where the starting setup did have IDs specified, and IDRQD latch 114 in FIG. 8 is set indicating that IDs are required. Therefore, when DSR is brought up, IDEXC latch 154 in FIG. 10 is set to enter the "ID exchange" mode. Before we send our LUID, RECV is brought up by the communication system indicating that a buffer has been received. The "ID check" mode will be entered to determine if this is an RUID buffer. Assuming that there is not a ",IDE" sequence in the buffer, CIDE will be false at the termination of the "ID check" mode. At this time, IDSENT, which is true since we have not sent our LUID yet, is anded with IDCHK, IDCHKD1, IDEXC and CIDE in AND gate 200 and gated through NOR gate 202 to set PRUID latch 207 as shown in FIG. 13. This enters the "process RUID" mode. Since the received buffer is a data buffer, a search will be made to find a setup that does not have IDs specified. Since IDBUF is false, IDRCVD latch 213 will not be set. However, PRUID and PRUIDD1 and IDRCVD are anded in AND gate 216 and gated through NOR gate 219 to set RUIDC latch 224 as shown in FIG. 14. LSKIP latch 231 will be set by combining RUIDC and RUIDCD1 as described previously. LSKIP is anded with LSKIPD1 in AND gate 238 to bring up BYTE1 for one bit time. This signal indicates that the first byte of the ID field of the setup is being read. Since IDRCVD is true, only the first character of the ID field will be checked. This is accomplished by anding BYTE1 with IDRCVD in AND gate 222 and gating through NOR gate 223 to reset RUIDC latch 224. Since this setup had IDs specified, EOID will not be decoded from data bus 1 by decode 1 labeled 56 during the time BYTE1 is true. Therefore, EOID remains false and RMATCH latch 254 is not set. Therefore, GNSU latch 261 in FIG. 15 will be set upon termination of RUIDC as described earlier, causing the next setup to be read from the media system. RUIDC latch 224 will again be set to determine if there are any IDs specified in this setup.

Consider the case that there are no IDs in this setup. BYTE1 will again be brought true for one clock time by anding LSKIP and LSKIPD1 as shown in FIG. 14. RUIDC latch 224 will be reset at the next clock time by anding BYTE1 and IDRCVD as described previously. However, this time EOID will be decoded on data bus 1 by decode 1 labeled 56 causing EOID to come true. EOID is then anded with BYTE1 and IDRCVD in AND gate 251 and gated through NOR gate 252 to set RMATCH latch 254 in FIG. 15, indicating that this setup is acceptable, that is a match has been found for the no ID case. The remainder of the "get next setup" mode operates as previously described. At the end of the "get next setup" mode, IDRCVD latch 213 in FIG. 13 will not be set since we did not receive an ID buffer. Therefore, even though we have not sent our LUID, indicated by IDSENT being false, SENDID will not be generated to send an LUID. Instead, IDRCVD is anded with PRUID and PRUIDD1 in AND gate 343 and gated through NOR gate 153 to reset IDEXC latch 154 in FIG. 10, ending the "ID exchange" mode. At this point, IDEXC is anded with IDEXCD1, IDRCVD, and RJOBL in AND gate 317 and gated through NOR gate 318 to set RJOBL latch 320 as shown in FIG. 19. This causes the data buffer which was received to be recorded on the media system.

The auto setup linking feature on this system is a circular search. After the highest numbered setup currently stored on the media system is processed, the setup search begins back at setup 1 and continues until the starting setup is again reached. This is accomplished in the following manner. Consider the case where the highest numbered setup on the media system has been read. When RNSU latch 135 in FIG. 9 is set again to read the next setup from the media system, SETUPCNT in FIG. 5 is brought true for one clock time as described earlier. This causes setup counter 11 to increment to one number higher than the highest numbered setup on the media system. When READM is subsequently brought up to indicate to the media system to read the setup, the media system brings up NOTFND simultaneously with DONE to indicate that the setup was not found. NOTFND is inverted by inverter 33 and inverted again by inverter 34 to generate RSTUPCNT into setup counter 11. This causes setup counter 11 to reset to zero. NOTFND is also anded with READ in AND gate 131 and gated through NOR gate 134 to set RNSU latch 135 as shown in FIG. 9. This causes the setup counter to be incremented to one and setup 1 is read from the media system. This completes the wrap around. From this point the setups are again read sequentially until the starting setup is reached.

After the last setup prior to the starting setup has been read, and RNSU has been brought up again to attempt to read the next setup, SETUPCNT in FIG. 5 being true for one clock time will cause setup counter 11 to increment to the starting set up number as indicated in starting setup register 10. The contents of starting setup register 10 and setup counter 11 are compared in compare 12 which causes SUCMP to come true, indicating that the starting setup has again been reached. SUCMP is then anded with RNSUD1 in AND gate 136 and gated through NOR gate 138 to reset RNSU latch 135 as shown in FIG. 9. SUCMP is also anded with RNSU and RNSUD1 in AND gate 330 and gated through NOR gate 141 to set LSTSU latch 143, indicating that there are no more setups. Referring to FIG. 5 SUCMP is also anded with RNSU and RNSUD1 in AND gate 35 which causes SETDNCNT to come true for one clock time. This causes setup counter 11 to decrement one count. This is to insure that upon the reception of another RUID buffer during this same session, the setups will not be searched again. Once LSTSU latch 143 in FIG. 9 is set, it remains set until DSR drops, at which time $\overline{DSR}$ is combined with LSTSU in NAND gate 142 to reset it.

In summary, a security controlled information exchange system for controlling the orderly exchange of information between two or more users under primary control of security identifiers is discussed. Each user is set up with a local user identifier (LUID) and a number of remote user identifiers (RUID). In the preferred embodiment, associated with selected ones of the RUIDs, are jobs which are to be communicated. A user initiates communication transfer by forwarding to another terminal its LUID and the receiving user compares the received LUID with its list of RUIDs and if a compare is made, the receiver forwards its own LUID to the initiating party. If a compare is not made it disconnects. The initiating party then compares the LUID which has been forwarded to it with its list of RUIDs and if no compare is made, it disconnects. If a compare is made, however, it holds onto the line and the called party then sends the jobs which are associated with the RUID which corresponds to the LUID which it received. Each RUID may be associated with a single unique job which may be forwarded to a calling user or may be associated with a number of jobs which may be chained and automatically forwarded to the calling user. In addition, a number of RUIDs may be associated with the same job or with selected ones of jobs in the complete job list.

Multi-level security as well as information control is therefore provided. The multi-level security is provided first by the calling party having its LUID identified by the called party. Secondly, the calling party must examine and verify the LUID sent by the called party. Finally, the security codes themselves are used to provide the intelligent selective exchange of information. That is, knowledge of the identifier code of a user itself is not sufficient in that to be meaningful the jobs associated with each remote user identifier code must also be known.

While the invention has been particularly shown and described with reference to a preferred embodiment, it will be understood by those skilled in the art the various changes in form and detail may be made without departing from the spirit and scope of the invention.

What is claimed is:

1. A method of communicating data between terminals in a system in a selective manner comprising the steps of:

assigning an LUID to each user in said system, transmitting the LUID of a calling user to a called terminal, and comparing the LUID of the calling user with an RUID of the called user at the called terminal and if a compare is made by the control logic of the terminal, transmitting the LUID of the called user to the calling terminal.

2. The method of communicating of claim 1 wherein the comparison of the LUID of the calling user is made against a first predetermined list of RUIDs.

3. The method of communicating of claim 1 in which there is an RUID assigned to said calling user with which a comparison of the transmitted LUID of the called user is made and if a comparison exists a data exchange is established, but if no comparison exists, communication between the two is aborted.

4. The method of communicating of claim 2 in which there is an RUID assigned to said calling user with which a comparison of the transmitted LUID of the called user is made and if a comparison exists a data exchange established, but if no comparison exists, communication between the two is aborted.

5. The method of communicating of claim 4 wherein there is a predetermined list of RUIDs assigned to said calling user with which a comparison of the transmitted LUID of the called user is made and if a comparison exists a data exchange is established, but if no comparison exists, communications between the two is aborted.

6. The method of communicating of claim 2 in which certain of said RUIDs of said called user are associated with predetermined jobs in one of a subset of jobs and said system is further operative to terminate communication of data to said calling user when all of said jobs in said one subset of jobs which are associated with an RUID have been transmitted.

7. The method of communicating of claim 3 in which certain of said RUIDs of said called user are associated with predetermined jobs in one of a subset of jobs and being operative to terminate communication of data to said calling user when all of said jobs in said subset of jobs which are associated with an RUID have been transmitted.

8. The method of communicating of claim 4 in which certain of said RUIDs of said called user are associated with predetermined jobs in one of a subset of jobs and being operative to terminate communication of data to said calling user when all of said jobs in said subset of jobs which are associated with an RUID have been transmitted.

9. The method of communicating of claim 5 in which certain of said RUIDs of said called user are associated with predetermined jobs in one of a subset of jobs and being operative to terminate communication of data to said calling user when all of said jobs in said subset of jobs which are associated with an RUID have been transmitted.

10. The method of communicating of claim 6 in which recorded along with each of said subsets there is an indicator marker which allows data from subsequent subsets to be transmitted when said subsequent subsets contain an RUID corresponding to said transmitted LUID.

11. The method of communicating of claim 7 in which recorded along with each of said subsets there is an indicator marker which allows data from subsequent subsets to be transmitted when said subsequent subsets contain an RUID corresponding to said transmitted LUID.

12. The method of communicating of claim 8 in which recorded along with each of said subsets there is an indicator marker which allows data from subsequent subsets to be transmitted when said subsequent subsets contain an RUID corresponding to said transmitted LUID.

13. The method of communicating of claim 9 in which recorded along with each of said subsets there is an indicator marker which allows data from subsequent subsets to be transmitted when said subsequent subsets contain an RUID corresponding to said transmitted LUID.

* * * * *

UNITED STATES PATENT OFFICE
CERTIFICATE OF CORRECTION

PATENT NO. : 4,114,139
DATED : September 12, 1978
INVENTOR(S) : William Weller Boyd, Robert Joseph Grafe, Carl Oscar Pingry, III It is certified that error appears in the above-identified patent and that said Letters Patent are hereby corrected as shown below:

Column 2, line 9, "the" (second occurrence) should read --are--;

Column 4, line 18, "called" should read --calls--; line 44, "emory" should read --memory--.

Column 5, line 14, "tha" should read --that--.

Column 6, line 8, "bit" should read --bits--.

Column 8, line 51, "OC1" should read --OCL--.

Column 9, line 12, "XFEr" should read --XFER--.

Column 10, line 20 "timme" should read --time--; line 36, following "through" insert --by--; line 46, "RECB" should read --RECV--.

Column 11, line 5, "iDCHKD1" should read --IDCHKD1--; line 8, "nected" should read --nect--; line 22, "contiue" should read --continue--; line 48, "countinhg" should read --conting--; line 49, "UPTC12" should read --UPTC2--; line 58 "Or" should read --OR--, line 65, following "124" insert --gated--.

Column 12, line 3, "15" should read --13--; line 24, "not" should read --no--; line 63, "RUICD1" should read --RUIDCD1--.

Column 13, line 29 "amd" should read --and--; line 30, "bing" should read --bring--.

Column 14, line 8 following "list" insert --.--; line 35, "UIDC" should read --RUIDC--; line 36, "emd" should read --end--; line 37, "makted" should read --match--; line 67, "rest" should read --reset--.

Column 15, line 8, "linkin" should read --linking--.

Column 16, line 23 "27" should read --271--; line 32, "RNSu" should read --RNSU--.

UNITED STATES PATENT AND TRADEMARK OFFICE
CERTIFICATE OF CORRECTION

PATENT NO. : 4,114,139
DATED : September 12, 1978
INVENTOR(S) : William Weller Boyd, Robert Joseph Grafe, Carl Oscar Pingry, III It is certified that error appears in the above-identified patent and that said Letters Patent are hereby corrected as shown below:

Column 17, line 17 "IDESCD1" should read --IDEXCD1--; line 52 "canned" should read --scanned--.

Column 18, line 6, "tine" should read --time--; line 9, delete "bring"; line 29, "though" should read --through--.

Column 19, line 38, following "check"" insert --mode--; line 62, "indicated" should read --indicate--.

Column 20, line 12 "UPCTD" should read --UPCTC--.

Column 21, line 15 "IS" should read --is--; line 20, "disconnecte" should read --disconnect--; line 25, "DISCis" should read --DISC is--.

Column 22, line 30, "INDEXCDI" should read --IDEXCD1--.

Column 24, line 62 "RNSU" should read "RNSU".

Signed and Sealed this

Twenty-sixth Day of December 1978

[SEAL]

Attest:

RUTH C. MASON
Attesting Officer

DONALD W. BANNER
Commissioner of Patents and Trademarks